United States Patent
Harry Putra et al.

(10) Patent No.: US 11,410,042 B2
(45) Date of Patent: Aug. 9, 2022

(54) DYNAMIC BOLTZMANN MACHINE FOR ESTIMATING TIME-VARYING SECOND MOMENT

(71) Applicant: INTERNATIONAL BUSINESS MACHINES CORPORATION, Armonk, NY (US)

(72) Inventors: Rudy Raymond Harry Putra, Yokohama (JP); Takayuki Osogami, Yamato (JP); Sakyasingha Dasgupta, Shinagawa-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 953 days.

(21) Appl. No.: 16/176,247

(22) Filed: Oct. 31, 2018

(65) Prior Publication Data

US 2020/0134464 A1 Apr. 30, 2020

(51) Int. Cl.
*G06N 3/08* (2006.01)
*G06N 3/04* (2006.01)

(52) U.S. Cl.
CPC ........... *G06N 3/084* (2013.01); *G06N 3/0445* (2013.01); *G06N 3/0472* (2013.01)

(58) Field of Classification Search
CPC ..... G06N 3/084; G06N 3/0445; G06N 3/0472
See application file for complete search history.

(56) References Cited

U.S. PATENT DOCUMENTS

| | | |
|---|---|---|
| 8,301,537 B1 | 10/2012 | Rachev et al. |
| 2016/0092767 A1 | 3/2016 | Osogami et al. |
| 2016/0098631 A1 | 4/2016 | Osogami |
| 2018/0060729 A1 | 3/2018 | Osogami |
| 2018/0129968 A1 | 5/2018 | Osogami |
| 2018/0144266 A1 | 5/2018 | Osogami |

OTHER PUBLICATIONS

Akgiray (Conditional Heteroscedasticity in Time Series of Stock Returns: Evidence and Forecasts, Jan. 1989, pp. 55-80) (Year: 1989).*
Kajino (A Functional Dynamic Boltzmann Machine, Aug. 2017, pp. 1987-1993) (Year: 2017).*
Chung (Financial Time Series Forecasting using Conditional Restricted Boltzmann Machine, Dec. 2015, pp. 0-192) (Year: 2015).*

(Continued)

*Primary Examiner* — George Giroux
(74) *Attorney, Agent, or Firm* — Tutunjian & Bitetto, P.C.; Randall Bluestone

(57) ABSTRACT

A computer-implemented method includes employing a dynamic Boltzmann machine (DyBM) to predict a higher-order moment of time-series datasets. The method further includes acquiring the time-series datasets transmitted from a source node to a destination node of a neural network including a plurality of nodes, learning, by the processor, a time-series generative model based on the DyBM with eligibility traces, and obtaining, by the processor, parameters of a generalized auto-regressive heteroscedasticity (GARCH) model to predict a time-varying second-order moment of the times-series datasets.

17 Claims, 9 Drawing Sheets

(56) References Cited

OTHER PUBLICATIONS

Dasgupta et al., "Nonlinear Dynamic Boltzmann Machines for Time-Series Prediction", Proceedings of the 31st AAAI Conference on Artificial Intelligence. Jan. 29-31, 2017. pp. 1833-1839.

Dasgupta et al., "Regularized Dynamic Boltzmann Machine with Delay Pruning for Unsupervised Learning of Temporal Sequences", arXiv preprint arXiv: 1610.01989v1. Sep. 22, 2016. pp. 1-6.

Ferreira et al., "Estimation and prediction of time-varying GARCH models through a state-space representation: a computational approach", Journal of Statistical Computation and Simulation. vol. 87. Issue 12. Jun. 5, 2017. pp. 1-2.

Osogami et al., "Learning the values of the hyperparameters of a dynamic Boltzmann machine", IBM Journal of Research and Development. vol. 61. No. 4. Paper 8. Jul./Sep. 2017. pp. 8:1-8:8.

Osogami et al., "Seven neurons memorizing sequences of alphabetical images via spike-timing dependent plasticity", Scientific Reports. Sep. 16, 2015. pp. 1-13.

Smith et al., "Second Order Filter Distribution Approximations for Financial Time Series with Extreme Outliers", Journal of Business & Economic Statistics. vol. 24. No. 3. Jul. 2006. pp. 1-36.

* cited by examiner

DyBM for Gaussian Distributions

Assumption:

$$p\left(\mathbf{x}^{[t]}|\mathbf{x}^{[t-T,t-1]}\right) = \prod_{j=1}^{N} p_j\left(x_j^{[t]}|\mathbf{x}^{[t-T,t-1]}\right)$$

$$p_j\left(x_j^{[t]}|\mathbf{x}^{[t-T,t-1]}\right) = \frac{1}{\sqrt{2\pi\sigma_j^2}} \exp\left(-\frac{\left(x_j^{[t]} - \mu_j^{[t]}\right)^2}{2\sigma_j^2}\right)$$

Prediction:

$$\mu^{[t]} = \mathbf{b} + \sum_{\delta=1}^{d-1} \mathbf{W}_\delta \mathbf{x}^{[t-\delta]} + \sum_{k=1}^{K} \mathbf{U}_k \sum_{\delta=d}^{\infty} \lambda_k^{(\delta-d+1)} \mathbf{x}^{[t-\delta]}$$

502

GARCH (p,q) model Method A

$$x_t = \mu + \sigma_t \epsilon_t, \quad \epsilon_t \sim N(0,1)$$

$$\sigma_t^2 = a_0 + \sum_{i=1}^{p} a_i (x_{t-i} - \mu)^2 + \sum_{j=1}^{q} b_j \sigma_{t-j}^2$$

504

GARCH (d,k) model Method B

$$\sigma_t^2 = v_0 + \sum_{i=1}^{d} w_i e_{t-i}^2 + \sum_{j=1}^{k} u_j \sum_{i=d+1}^{\infty} \lambda_k^{i-d} e_{t-i}^2$$

DYNAMIC BOLTZMANN MACHINE FOR ESTIMATING TIME-VARYING SECOND MOMENT

BACKGROUND

Technical Field

The present elates generally to Boltzmann machines, particularly, to Boltzmann machines for estimating a time-varying second moment of time-series datasets.

Description of the Related Art

A neural network, such as a Boltzmann machine and the like, can learn a model corresponding to data input in time series. In particular, a dynamic Boltzmann machine is expected to be able to achieve high learning power through machine learning. Such a Boltzmann machine or the like handles binary data with values of 1 or 0 based on probability, for example, and therefore it is difficult for such a Boltzmann machine or the like to be adapted to real number time-series data.

SUMMARY

In accordance with an embodiment, a computer-implemented method executed on a processor for employing a dynamic Boltzmann machine (DyBM) to predict a higher-order moment of time-series datasets is provided. The method includes acquiring the time-series datasets transmitted from a source node to a destination node of a neural network including a plurality of nodes, learning, by the processor, a time-series generative model based on the DyBM with eligibility traces, and obtaining, by the processor, parameters of a generalized auto-regressive heteroscedasticity (GARCH) model to predict a time-varying second-order moment of the times-series datasets.

In accordance with another embodiment, a non-transitory computer-readable storage medium is provided including a computer-readable program executed on a processor for employing a dynamic Boltzmann machine (DyBM) to predict a higher-order moment of time-series datasets, wherein the computer-readable program when executed on the processor causes a computer to perform the steps of acquiring the time-series datasets transmitted from a source node to a destination node of a neural network including a plurality of nodes, learning, by the processor, a time-series generative model based on the DyBM with eligibility traces, and obtaining, by the processor, parameters of a generalized auto-regressive heteroscedasticity (GARCH) model to predict a time-varying second-order moment of the times-series datasets.

In accordance with yet another embodiment, a system is provided for employing a dynamic Boltzmann machine (DyBM) to predict a higher-order moment of time-series datasets. The system includes a memory and one or more processors in communication with the memory configured to acquire the time-series datasets transmitted from a source node to a destination node of a neural network including a plurality of nodes, learn, by the processor, a time-series generative model based on the DyBM with eligibility traces, and obtain, by the processor, parameters of a generalized auto-regressive heteroscedasticity (GARCH) model to predict a time-varying second-order moment of the times-series datasets.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein:

FIG. 10 shows a framework for predicting a higher-order moment of a time-series dataset, according to an embodiment of the present invention.

Throughout the drawings, same or similar reference numerals represent the same or similar elements.

DETAILED DESCRIPTION

Embodiments in accordance with the present invention provide methods and devices for employing a dynamic Boltzmann machine to predict time series data. Such time series data can include financial data. Financial time-series datasets often follow non-Gaussian distributions. The exemplary embodiments provide a framework for employing a dynamic Boltzmann machine in combination with Generalized Auto-Regressive Conditional Heteroskedasticity (GARCH) models.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
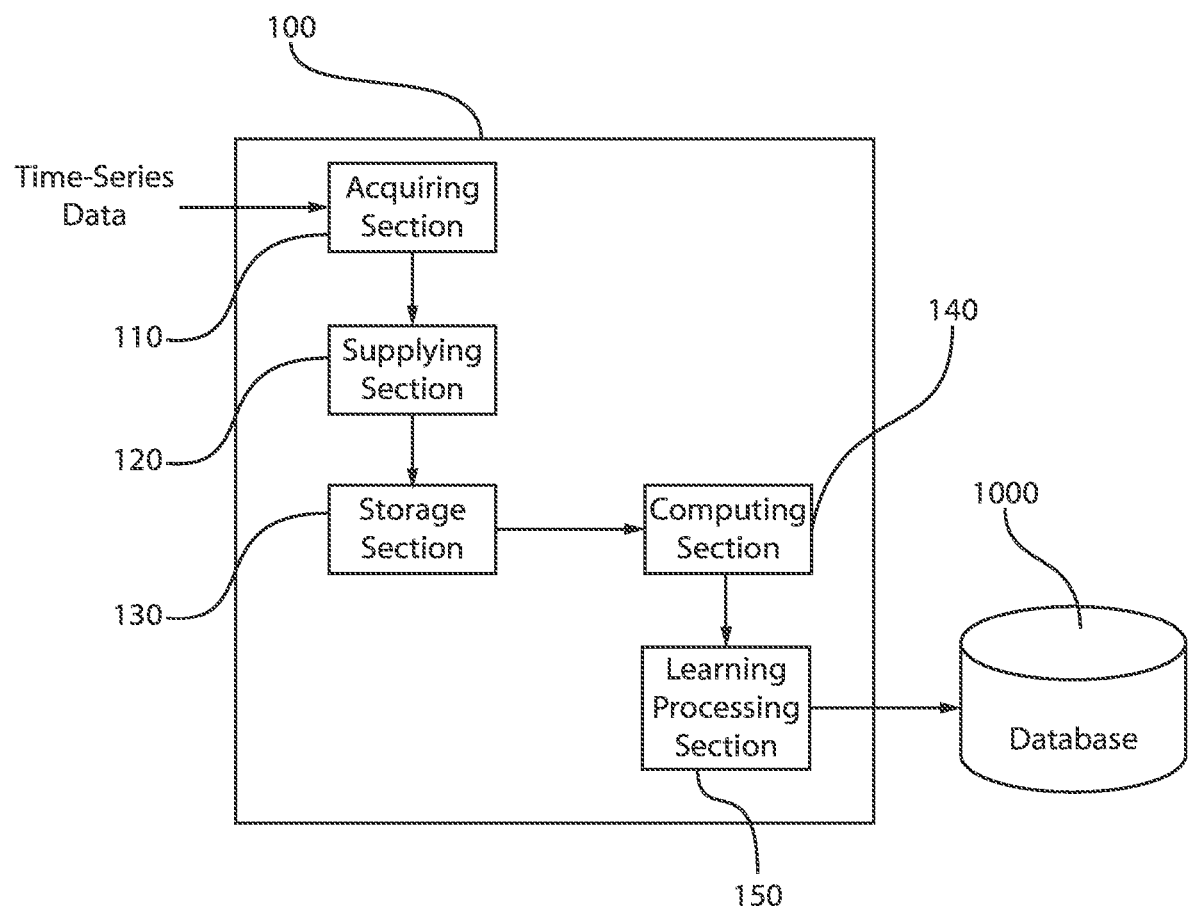
FIG. 1 shows an exemplary configuration of a learning apparatus, according to an embodiment.

FIG. 1 shows an exemplary configuration of a learning apparatus 100 according to an embodiment. The learning apparatus 100 can be an apparatus for learning a model 10 corresponding to time-series input data. The learning apparatus 100 can be configured to learn a model based on a Boltzmann machine by supplying time-series data to nodes of the model. The learning apparatus 100 includes an acquiring section 110, a supplying section 120, a storage section 130, a computing section 140, and a learning processing section 150.

The acquiring section 110 can be configured to acquire time-series input data. Time-series input data can be, for example, a data sequence in which a plurality of pieces of data are arranged along a time axis, such as moving image data. The acquiring section 110 can be connected to a device operated by a user or a device (e.g., sensor) that detects and/or outputs time-series data and can acquire the time-series input data from such a device. Alternatively, the acquiring section 110 can read and acquire time-series input data stored in a storage device in a predetermined format. Alternatively, the acquiring section 110 can be connected to a network and acquire time-series input data via the network. The acquiring section 110 can also store the acquired time-series input data in a storage device included in the learning apparatus 100.

The supplying section 120 can be configured to supply a plurality of input values corresponding to input data at one time point in the time-series input data to a plurality of nodes of a model. The supplying section 120 is connected to the acquiring section 110 and can handle, as training data, input data at one time point in the received time-series input data and supply input values at the one time point to corresponding nodes of the model. Input data at one time point can be the temporally newest data in a training data set for use in learning. Alternatively, input data at one time point can be temporally intermediate data in a training data set for use in learning. That is, input data at one time point can be selected arbitrarily from the time-series data.

The storage section 130 can be configured to store values of hidden nodes of the model in correspondence with a plurality of time points in the time-series input data. The storage section 130 can sample the values of hidden nodes corresponding to one time point and store these values in the hidden nodes corresponding to this time point. The storage section 130 can store the sampled values respectively in the hidden nodes corresponding to the time points for each time point.

The computing section 140 can be configured to compute a conditional probability of each input value at one time point on a condition that an input data sequence has occurred. Here, in the time-series input data, the pieces of data input to the respective nodes of the model at one time point are referred to as input values at one time point, and the pieces of data input to the respective nodes at the time points before the one time point are referred to as the input data sequence. A model used by the learning apparatus 100 can have a weight parameter between (i) a plurality of hidden nodes and a plurality of input values corresponding to input data at each dine point prior to the one time point in an input data sequence and (ii) a plurality of hidden nodes corresponding to the one time point and a plurality of input nodes.

The computing section 140 can be configured to compute a conditional probability of each input value at one time point, on the basis of an input data sequence before the one time point in the time-series input data, the stored values of hidden nodes, and the weight parameter of the model. Furthermore, the computing section 140 can be configured to compute a conditional probability of the value of each hidden node at one time point on a condition that an input data sequences has occurred, based on an input data sequence before the one time point in the time-series input data and the weight parameter of the model.

The learning processing section 150 can be configured to increase a conditional probability of input data at one time point occurring on a condition that the input data sequence has occurred, by adjusting the weight parameter of the model. The learning processing section 150 can further adjust bias parameters which are given respectively to the plurality of nodes and hidden nodes of the model. The learning processing section 150 can supply the adjusted weight parameter and bias parameters of the model to a storage device, such as an external database 1000, to store these parameters in the storage device.

The above-described learning apparatus 100 according to the present embodiment can be configured to learn the model by adjusting the weight parameter and bias parameters of the model, based on input data at one time point in the time-series input data. The model, according to the present embodiment, is described with reference to FIG. 2.

Figure 2:
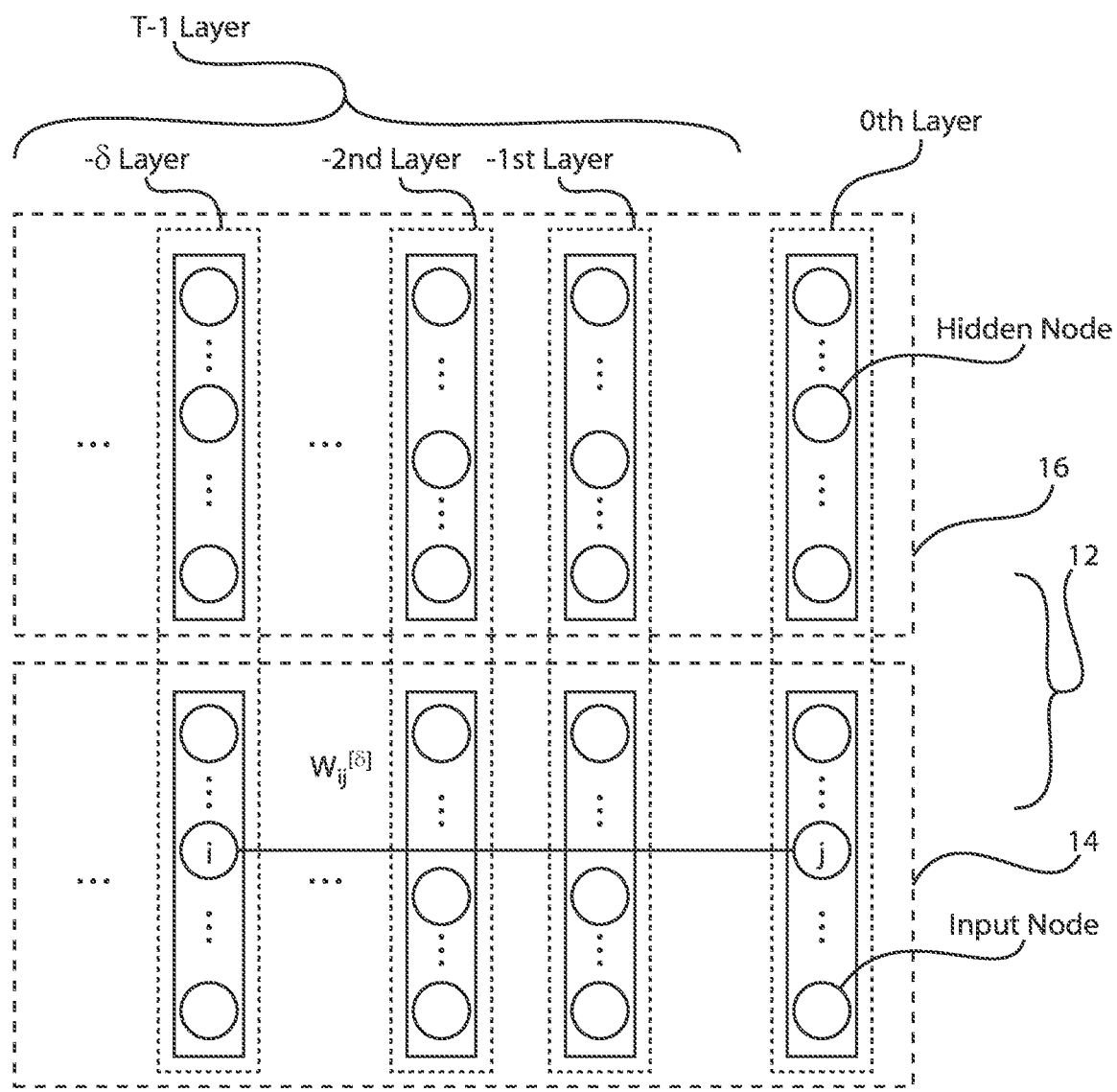
FIG. 2 shows an exemplary configuration of a model, according to an embodiment.

FIG. 2 shows an exemplary configuration of a model 10 according to the present embodiment. The model 10 includes a plurality of common layers 12. FIG. 2 shows an example including a total of T common layers 12. The model 10 can include a finite number of common layers 12. Each common layer 12 includes an input layer 14 and a hidden layer 16.

Each input layer 14 can be a layer corresponding to the time-series data. Each input layer 14 can correspond to a respective time point in the time-series data. Each input layer 14 can include a predetermined number of nodes. For example, the 0-th input layer can be a layer corresponding to input data at one time point in the time-series data. The 0-th input layer can include a plurality of nodes corresponding to the number of input values in this input data.

A total of T−1 input layers 14 other than the 0-th input layer 14 among the plurality of input layers can be input layers 14 corresponding to the input data sequence before the one time point in the time-series input data. For example, the −1st input layer can correspond to input data at a time point that temporally precedes the one time point by one time point, and the (−δ)-th input layer can correspond to input data at a time point that temporally precedes the one time point by δ time points. That is, a total of T−1 input layers other than the 0-th input layer each have the same number of nodes as the 0-th input layer and are respectively supplied with input values of corresponding input data values in the input data sequence, for example.

Each hidden layer 16 can correspond to a respective time point in the time-series data. For example, the 0-th hidden layer can be a layer corresponding to one time point in the time-series data. FIG. 2 shows an example including a total of T hidden layers 16. Each hidden layer 16 can include one or more hidden nodes, and the storage section 130 can store the values sampled at the one time point.

A total of T−1 hidden layers other than the 0-th hidden layer among the plurality of hidden layers 16 can be hidden layers 16 corresponding to time points before the one time point in the time-series data. For example, the −1st hidden layer corresponds to a time point that temporally precedes the input data of the one-time point by one time point, and the storage section 130 stores the values sampled at the time point that temporally precedes the one time point by one time point. Furthermore, the (−δ)-th hidden layer can correspond to a time point that temporally precedes the input data of the one-time point by δ time points, and the storage section 130 can store the values sampled at the time point that temporally precedes the one time point by δ time points. That is, a total of T−1 hidden layers other than the 0-th hidden layer each have the same number of nodes as the 0-th hidden layer and are respectively supplied with values of corresponding hidden nodes, for example.

As an example, in the case where the time-series input data is moving image data, the last image data of the moving image data corresponds to the 0-th input layer, and a plurality of nodes of the 0-th input layer each receive corresponding pixel data of the image data. Furthermore, the 0-th hidden layer corresponds to the final time point of the moving image data, and the storage section 130 can store values sampled at this final time point in the hidden nodes of the 0-th hidden layer.

In addition, the −1st input layer is supplied with image data that immediately precedes the last image data, and a plurality of nodes of the −1st input layer each receive corresponding pixel data of the immediately preceding image data. Furthermore, the −1st hidden layer corresponds to the time point that immediately precedes the final time point, and for each of the plurality of nodes of the −1st hidden layer, the storage section 130 can store the values sampled at this immediately preceding time point. Similarly, the plurality of nodes of the (−δ)-th input layer each receive corresponding pixel data of image data that precedes the last image data by δ images, and the plurality of nodes of the (−δ)-th hidden layer each store corresponding sampling values at the time point that precedes the last time point by δ time points.

FIG. 2 shows an example in which each common layer 12 includes an input layer 14 and a hidden layer 16, but instead, one or more common layers 12 need not include a hidden layer 16. In such a case, the 0-th common layer to the (−m)-th common layer includes input layers 14 and hidden layers 16, and the (−m−1)-th common layer to (−T+1)-th common layer can include input layers 14.

The plurality of nodes in the 0-th input layer 14 and/or the plurality of hidden nodes in the 0-th hidden layer 16 can each have a bias parameter. For example, the j-th node j in the common layer 12 has a bias parameter $b_j$.

The plurality of nodes in the 0-th input layer 14 and the nodes of the hidden layer 16 corresponding to the input data sequence and layers corresponding to the input data sequence before the one time point can respectively have weight parameters therebetween. There need not be weight parameters between the plurality of nodes in each input layer 14 and hidden layer 16.

Similarly, the plurality of nodes in the 0-th hidden layer 16 and the nodes of the hidden layer 16 corresponding to the input data sequence and layers corresponding to the input data sequence before the one time point can respectively have weight parameters therebetween. That is, the plurality of nodes of the 0-th common layer 12 and the nodes of the plurality of common layers 12 before the one time point can respectively have weight parameters therebetween.

FIG. 2 shows a concept of a weight parameter $W_{ij}^{[\delta]}$ between the node j of the 0-th input layer and a node i of the (−δ)-th layer. FIG. 2 shows an example in which the model 10 has the same number of input layers 14 and layers 16, each input layer 14 includes I nodes, and each hidden layer 16 includes H hidden nodes. In the present embodiment, the input layers 14 and hidden layers 16 are expressed by one common layer 12 that has a plurality of nodes $x_j^{[t]}$. The first to I-th nodes (1≤j≤I) of the common layer 12 indicate the nodes of the input layer 14, and the (I+1)-th to (I+H)-th nodes (I+1, j, I+H) indicate hidden nodes.

For example, the weight parameter $W_{ij}^{[\delta]}$ shown in FIG. 2 indicates a weight parameter between two nodes of an input layer 14. Similarly, the weight parameter $W_{ij}^{[\delta]}$ can include weight parameters from an input node to a hidden node, from a hidden node to an input node, and between to hidden nodes. A specific example of a weight parameter $W_{ij}^{[\delta]}$ is shown in Expression 1 below. In the present embodiment, a weight parameter from an input node or hidden node to an input node is referred to as a "weight parameter to an input node," and a weight parameter from an input node or hidden node to a hidden node is referred to as a 'weight parameter to a hidden node."

$$W_{ij}^{[\delta]} = \hat{W}_{ij}^{[\delta]} + \hat{W}_{ij}^{[-\delta]}$$

$$\hat{W}_{ij}^{[\delta]} = \begin{cases} 0 & \text{if } \delta = 0 \\ \sum_{k \in K} u_{i,j,k} \lambda_k^{\delta - d_{ij}} & \text{if } \delta \geq d_{ij} \\ \sum_{l \in L} -v_{i,j,l} \mu_l^{-\delta} & \text{otherwise} \end{cases}$$

Expression 1

Here, $u_{i,j,k}$ and $v_{i,j,l}$ are learning parameters that are learning targets, for example. Furthermore, $\lambda_k^{t1}$ and $\mu_l^{t2}$ are predefined parameters that change in a predetermined manner in accordance with a time point difference δ between the hidden nodes and input data in the input data sequence before the one time point and the hidden nodes and input data at the one time point (t1=δ−$d_{ij}$, t2=−δ). That is, the weight parameter $W_{ij}^{[\delta]}$ can be a parameter based on the learning parameters $u_{i,j,k}$ and $v_{i,j,l}$ and the predefined parameters $\lambda_k^{t1}$ and $\mu_l^{t2}$.

The weight parameter $W_{ij}^{[\delta]}$ can be a parameter based on a positive value, which is based on a product of the first learning parameter $u_{i,j,k}$ and the first predefined parameter $\lambda_k^{t1}$, and a negative value, which is based on a product of the second learning parameter $v_{i,j,l}$ and a second predefined parameter $\mu_l^{t2}$. Specifically, in the case where the time point difference δ is greater than or equal to a predetermined delay constant $d_{ij}$, the weight parameter $W_{ij}^{[\delta]}$ can be a positive value based on a product of the first learning parameter $u_{i,j,k}$ and the first predefined parameter $\lambda_k^{t1}$. In the case where the time point difference δ is less than the delay constant $d_{ij}$ and is not equal to 0, the weight parameter $W_{ij}^{[\delta]}$ can be a negative value based on a product of the second learning parameter $v_{i,j,l}$ and the second predefined parameter $\mu_l^{t2}$. In addition, in the case where the time point difference δ is equal to 0, the weight parameter $W_{ij}^{[\delta]}$ can be equal to 0.

In addition, in the case where the time point difference δ is greater than or equal to the predetermined delay constant $d_{ij}$, the weight parameter $W_{ij}^{[\delta]}$ can be based on a plurality of positive values that are based on the products $u_{i,j,k} \lambda_k^{t1}$ of a plurality of sets of the first learning parameter $u_{i,j,k}$ and the first predefined parameter $\delta_k^{t1}$ respectively from among the plurality of first learning parameters $u_{i,j,k}$ and the plurality of first predefined parameters $\lambda_k^{t1}$. In addition, in the case where the time point difference $\delta$ is less than the predetermined delay constant $d_{ij}$ and is not equal to 0, the weight parameter $W_{ij}^{[\delta]}$ can be based on a plurality of negative values that are based on products $v_{i,j,l} \mu_l^{t2}$ of a plurality of sets of the second learning parameter $v_{i,j,l}$ and the second predefined parameter $\mu_l^{t2}$ respectively from among the plurality of second learning parameters $v_{i,j,l}$ and the plurality of second predefined parameters $\mu_l^{t2}$.

A predefined parameter can be a parameter based on a value obtained by raising predetermined constant to the power of a value based on the tingepoint difference $\delta$. The first predefined parameter $\lambda_k^{t1}$ is a parameter whose value gradually decreases as the time point difference $\delta$ increases, for example. In this case, the first predefined parameter $\lambda_k^{t1}$ can be a value obtained by raising a first constant $\lambda_k$, which is greater than 0 and less than 1, to the power of a value obtained by subtracting the predetermined delay constant $d_{ij}$ from the time point difference $\delta$ ($\delta - d_{ij} = t1$). In addition, the second predefined parameter $\mu_l^{t2}$ can be a parameter whose value gradually decreases as the time point difference $\delta$ increases, for example. In this case, the second predefined parameter $\mu_l^{t2}$ can be a value obtained by raising a second constant $\mu_l$, which is greater than 0 and less than 1, to the power of a negative value of the time point difference $\delta$ ($-\delta = t2$).

The above-described model 10 according to the present embodiment can be configured to form a Boltzmann machine. That is, the model 10 can be a Boltzmann machine to which time-series data is applied. The model 10 can be a Boltzmann machine that includes hidden layers 16 into which are input values differing from the time-series data, in addition to the input layers 14 into which the time-series data is input. The learning apparatus 100 according to an embodiment learns the model 10 by adjusting the learning parameters $u_{i,j,k}$ and $v_{i,j,l}$ and the bias parameter $b_j$ while sampling and storing the values of the hidden nodes, by using, as training data, input data at one time point that is supplied to the 0-th input layer of the model 10. A learning operation of the learning apparatus 100 is described with reference to FIG. 3.

Figure 3:
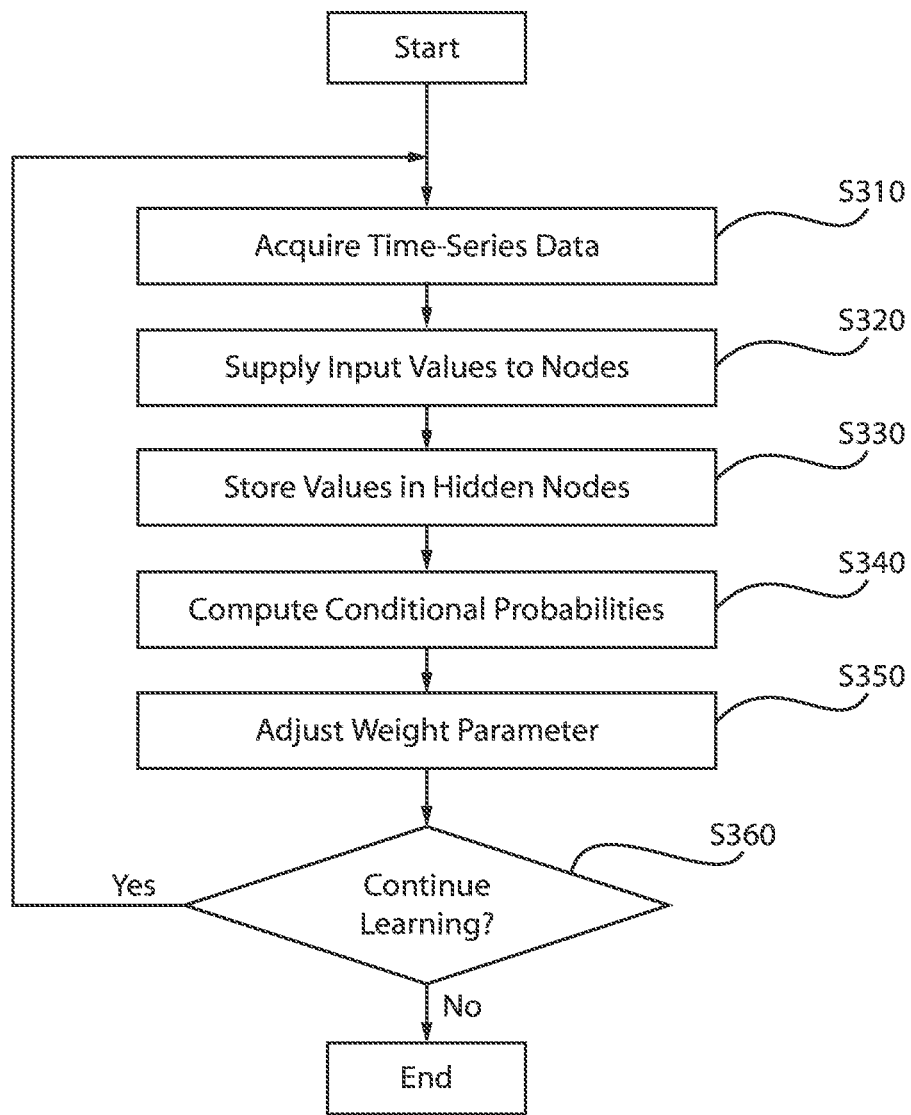
FIG. 3 shows a flow of an operation of the learning apparatus, according to an embodiment.

FIG. 3 shows a flow of an operation of the learning apparatus 100 according to the present embodiment. In the present embodiment, the learning apparatus 100 can be configured to learn the model 10 corresponding to time-series input data and determine the learning parameters $u_{i,j,k}$ and $v_{i,j,l}$ and the bias parameter $b_j$, by executing the processing steps of S310 to S360. In an embodiment, first, an example is described in which the determination of the weight parameters to the hidden nodes and the weight parameters to the input nodes is performed by the learning apparatus 100 using substantially the same operation.

First, the acquiring section 110 can acquire time-series data (S310). The acquiring section 110 can acquire time-series data of a duration equivalent to a total of T layers from the 0-th layer to the (−T+1)-th layer of the model 10. The acquiring section 110 acquires, for example, T pieces of image data in time-series that form the moving image data.

Then, the supplying section 120 can supply a plurality of input values corresponding to the input data of the time-series input data at one time point to the plurality of input nodes of the 0-th input layer of the model 10 (S320). Here, $x_{[1,I]}^{[0]} (= x_j^{[0]}, 1 \leq j \leq I)$ denotes input data supplied to the 0-th input layer.

The supplying section 120 supplies, for example, I input values $x_j^{[0]}$ corresponding to input data $x_{[1,I]}^{[0]}$ of the time-series input data at the most recent time point to the corresponding nodes j of the 0-th input layer ($1 \leq j \leq I$). For example, the supplying section 120 supplies I pieces of pixel data included in the last piece of image data of T pieces of image data arranged in time series to form the moving image data to I nodes of the 0-th input layer. The supplying section 120 can supply a value of 1 or 0 as the pixel data to each node of the 0-th input layer. If the duration of the time-series input data is shorter than T, the supplying section 120 can supply the data to a number of layers from the 0-th input layer corresponding to the length of the time series, and can supply a value of 0, for example, to the nodes of the rest of the layers.

Then, the supplying section 120 can supply a plurality of input values corresponding to the input data sequence before the one time point to the plurality of nodes included in respective layers from the −1st input layer to the (−T+1)-th input layer of the model 10. Here, let $x_j^{(-T, -1]}$ denote input data supplied to layers from the −1st input layer to the (−T+1)-th input layer ($1 \leq j \leq I$). The term (−T, −1] indicates layers from the (−T+1)-th layer to the −1st layer. That is, the input data $x_j^{(-T, -1]}$ in the time-series data denotes a history up to the input data $x_j^{[0]}$, for example.

Next, the storage section 130 samples the values of a plurality of hidden nodes corresponding to the one time point, and respectively stores these values in the corresponding plurality of hidden nodes of the 0-th hidden layer (S330). The storage section 130 can arbitrarily or randomly input values of 1 or 0. The storage section 130 stores H sampled values in the corresponding hidden nodes j of the 0-th hidden layer, for example ($I+1 \leq j \leq I+H$).

The storage section 130 can store the values of the hidden nodes before the one time point respectively in a plurality of nodes in each of the corresponding hidden layers from the −1st hidden layer to the (−T+1)-th hidden layer of the model 10. Here, let $x_j^{(-T, -1]}$ denote the values of the hidden nodes stored in the layers from the −1st hidden layer to the (−T+1)-th hidden layer ($I+1 \leq j \leq I+11$). That is, the values $x_j^{(-T, -1]}$ input to the nodes of each common layer 12 before the one time point denote a history up to the input values $x_j^{[0]}$ input to the nodes of the 0-th common layer, for example ($1 \leq j \leq I+H$).

Then, the computing section 140 can compute conditional probabilities of each input value $x_j^{[0]} (1 \leq j \leq I)$ of an input node at the one time point, based on the input values $x_j^{(-T, -1]}$ ($1 \leq j \leq I+H$) of the plurality of nodes of the (−T+1)-th common layer to the −1st common layer and the weight parameter $W_{ij}^{[\delta]}$ (S340). The computing section 140 computes a probability $\langle x_j^{[0]} \rangle_\theta$ of the input value $x_j^{[0]} (1 \leq j \leq I)$ of the j-th node of the 0-th input layer being equal to 1 by substituting 1 for $x_j^{[0]}$ in the following expression, based on the history $x^{(-T, -1]}$ ($1 \leq j \leq I+H$) of the plurality of nodes of the common layer 12.

$$\langle X_j^{[0]} \rangle_\theta = \quad \text{Expression 2}$$

$$p_{\theta,j}(x_j^{[0]} | x^{(-T,-1]}) = \frac{\exp(-\tau^{-1} E_{\theta,j}(x_j^{[0]} | x^{(-T,-1]}))}{1 + \exp(-\tau^{-1} E_{\theta,j}(x_j^{[0]} | x^{(-T,-1]}))}$$

In an embodiment, an example is described in which the input value $x_j^{[0]}$ of each node is binary, e.g., 1 or 0, but the value of the input value $x_j^{[0]}$ is not limited to these values. Furthermore, in the step for computing the conditional probabilities of each input value $x_j^{[0]}$ ($1 \leq j \leq I$) of the 0-th input layer, the computing section 140 can compute the conditional probabilities of the values $x_j^{[0]}$ (I+1≤j≤I+H) of the 0-th hidden layer.

Expression 2 is derived as a Boltzmann machine from a known probability formula. For example, θ denotes a set of parameters to be computed, and the formula $\theta=(b_j, u_{i,j,k}, v_{i,j,l})$ is established. In addition, τ can be a parameter that is dependent on a known "system temperature" of the Boltzmann machine, and can be preset by a user or the like.

Also, $E_{\theta,j}(x_j^{[0]}|x^{(-T,-1)})$ of Expression 2 is computed by using the following expression.

$$E_{\theta,j}(x_j^{[0]}|x^{(-T,-1)}) = -b_j x_j^{[0]} - \Sigma_{t=-T}^{-1}(x^{[t]})^T(x^{[t]})W_{:,j}^{[-t]}x_j \quad \text{Expression 3}$$

Here, "T" denotes a transpose, ":" denotes 1 to n in case where n (=I+H) denotes the number of nodes, and ":,j" indicates extraction of the j-th column. That is, the second term on the right side of Expression 3 is denoted by the following expression, for example.

$$\sum_{t=-T}^{-1}(x^{[t]})^T W_{i,j}^{[-t]} x_j^{[0]} = (x_1^{[t]}, x_2^{[t]}, \ldots, x_n^{[t]}) \begin{pmatrix} W_{1,j}^{[-t]} \\ W_{2,j}^{[-t]} \\ \vdots \\ W_{n,j}^{[-t]} \end{pmatrix} x_j^{[0]} =$$

$$\sum_{i=1}^{N}\left(\sum_{k \in K} u_{i,j,k}\alpha_{i,j,k} - \sum_{l \in L} v_{i,j,l}\beta_{i,j,l} - \sum_{l \in L} v_{i,j,l}\gamma_{i,l}\right) x_j^{[0]} \quad \text{Expression 4}$$

Here, $\alpha_{i,j,k}$, $\beta_{i,j,l}$, and $\gamma_{i,l}$ are denoted by the following expressions.

$$\alpha_{i,j,k} = \Sigma_{t=-T}^{-d_{ij}} \lambda_k^{-t-d_{ij}} x_i^{[t]} \quad \text{Expression 5}$$

$$\beta_{i,j,l} = \Sigma_{t=-d_{ij}+1}^{-1} \mu_l^{-t} x_i^{[t]} \quad \text{Expression 6}$$

$$\gamma_{i,l} = \Sigma_{t=-T}^{-1} \mu_l^{-t} x_i^{[t]} \quad \text{Expression 7}$$

Accordingly, $P_{\theta,j}(1|x_j^{(-T,-1)})$ obtained by substituting 1 for $x_j^{[0]}$ of Expression 2 can be computed from Expression 3 by substituting 1 for $x_j^{[0]}$ in expression 5. Note that predetermined initial values (for example, 0) can be substituted for the parameter set $\theta=(b_j, u_{i,j,k}, v_{i,j,l})$. In this way, the computing section 140 can compute a conditional probability $\langle x_j^{[0]} \rangle_\theta$ of each input value $x_j^{[0]}$ at the one-time point which is denoted by Expression 2.

Then, the learning processing section 150 can adjust the parameter set $\theta=(b_j, u_{i,j,k}, v_{i,j,l})$ (S350). When adjusting the bias parameter $b_j$, the learning processing section 150 can determine a direction of the change in the bias parameter $b_j$ by using the following expression.

$$\frac{\partial}{\partial b_j}\log P_\theta(x_{[1,I]}^{[0]} | x^{(-T,-1)}) = \tau^{-1}(x_j^{[0]} - \langle X_j^{[0]} \rangle_\theta) \quad \text{Expression 8}$$

Here, $x_j^{[0]}$ on the right side of Expression 8 denotes an input value supplied as training data by the supplying section 120, and $\langle x_j^{[0]} \rangle_\theta$ on the right side denotes a probability computed by using Expression 2 (1≤j≤I). The bias parameter $b_j$ for each input node (1≤j≤I) can be adjusted and updated as denoted by the following expression by using Expression 8. Note that a coefficient c is a parameter predetermined by the user or the like.

$$b_j \leftarrow b_j + c\frac{1}{\tau}(x_j^{[0]} - \langle X_j^{[0]} \rangle_\theta) \quad \text{Expression 9}$$

That is, the learning processing section 150 adjusts the bias parameter $b_j$ so as to increase the conditional probability of the input value $x_j^{[0]}$ of the node of the 0-th input layer occurring, on a condition that the history $x^{(-T,-1)}$ of the common layer 12 has occurred. The learning processing section 150 can iteratively perform updating of the bias parameter $b_j$ denoted by Expression 9 and computing of the probability $\langle x_j^{[0]} \rangle_\theta$ denoted by Expression 2, to determine the bias parameter $b_j$. The learning processing section 150 stops updating the bias parameter $b_j$ and determines the bias parameter $b_j$ if a difference in the bias parameter $b_j$ before and after updating is less than or equal to a predetermined threshold. If a bias parameter $b_j$ is also set for a hidden node, the learning processing section 150 can determine the bias parameter $b_j$ of the hidden node in the same manner.

Alternatively, the learning processing section 150 can decide upon the bias parameter $b_j$ by iteratively updating the bias parameter $b_j$ a predetermined number of times. If a difference in the bias parameter $b_j$ before and after updating is greater than or equal to the predetermined threshold even after the bias parameter $b_j$ has been updated the predetermined number of times, the learning processing section 150 can stop updating the bias parameter $b_j$ and inform the user that the parameter does not converge.

Similarly, when updating the learning parameter $i_{i,j,k}$, the learning processing section 150 can determine the direction of a change in the learning parameter $u_{i,j,k}$ by using the following expression.

$$\frac{\partial}{\partial u_{i,j,k}}\log P_\theta(x_{[1,I]}^{[0]} | x^{(-T,-1)}) = \tau^{-1}\alpha_{i,j,k}(x_j^{[0]} - \langle X_j^{[0]} \rangle_\theta) \quad \text{Expression 10}$$

In addition, when updating the learning parameter $v_{i,k,l}$, the learning processing section 150 can determine the direction of a change in the learning parameter $v_{i,j,l}$ by using the following expression.

$$\frac{\partial}{\partial v_{i,j,l}}\log P_\theta(x_{[1,I]}^{[0]} | x^{(-T,-1)}) = \quad \text{Expression 11}$$
$$-\tau^{-1}\beta_{i,j,l}(x_j^{[0]} - \langle X_j^{[0]} \rangle_\theta) - \tau^{-1}\gamma_{j,i}(x_i^{[0]} - \langle X_i^{[0]} \rangle_\theta)$$

In the same manner as the updating of the bias parameter $b_j$, the learning processing section 150 can iteratively perform updating of the learning parameters $u_{i,j,k}$ and $v_{i,j,l}$ corresponding to the input nodes (1≤j≤I) and computing of the probability $\langle x_j^{[0]} \rangle_\theta$ to determine the learning parameters $u_{i,j,k}$ and $v_{i,j,l}$ corresponding to the input nodes (1≤j≤I). Alternatively, the learning processing section 150 can iteratively perform an operation for updating the parameter set $\theta=(b_j, u_{i,j,k}, v_{i,j,l})$ and then computing the probability $\langle x_j^{[0]} \rangle_\theta$ denoted by Expression 2 to determine the parameter set $\theta=(b_j, u_{i,j,k}, v_{i,j,l})$.

As described above, the learning processing section 150 according to the present embodiment can decide upon the learning parameters $u_{i,j,k}$ and $v_{i,j,l}$ and the bias parameter $b_j$ through learning. The learning apparatus 100 can then determine whether to continue learning (S360). The learning apparatus 100 can continue learning until it performs the learning process a predetermined number of times, or can continue learning until a stop command is input by the user. Alternatively, the learning apparatus 100 can continue learning until it can no longer acquire time-series data.

If the learning apparatus 100 continues learning (e.g., S360: YES), the process can return to step S310, in which the acquiring section 110 acquires the next time-series data, and the learning apparatus 100 can then perform learning of the model 10 based on the next time-series data. For example, the supplying section 120 supplies the 0-th input layer with the next image data in the image data acquired by the acquiring section 110. Furthermore, the storage section 130 samples the values of the hidden layers and stores these values in the 0-th hidden layer. Then, values held in the t-th common layer (−T<t<0) can be supplied to the (t−1)-th common layer. The values held in the (−T+1)-th layer can be deleted. The learning apparatus 100 can perform learning by using image data supplied to the layers from the 0-th input layer to the (−T+1)-th input layer as training data and using the values stored in the layers from the 0-th hidden layer to the (−T+1)-th hidden layer.

In this way, the supplying section 120 and the storage section 130 can sequentially acquire new input values $x_j^{[0]}$ at the next time point corresponding to the nodes of the 0-th common layer in the model 10. Then, the computing section 140 can compute a conditional probability $<x_j^{[0]}>_\theta$ of the new input value $x_j^{[0]}$ on a condition that the history has occurred for each common layer before the next time point. The learning processing section 150 can adjust the weight parameter so as to increase the conditional probability of the new input value occurring on the condition that this history has occurred.

If the learning processing section 150 stops learning (e.g., S360: NO), the learning processing section 150 can output the learning parameters $u_{i,j,k}$ and $v_{i,j,l}$ and the bias parameter $b_j$ that have been determined and store the parameters in the external database 1000 or the like.

As described above, the learning apparatus 100 according to an embodiment can be configured to apply, to time-series input data that is input in time series, a model having a total of T layers by associating one time point with the 0-th common layer and an input data sequence before the one time point with T−1 layers. The learning apparatus 100 can be configured to apply a model having hidden nodes to each common layer 12. That is, the learning apparatus 100 can be configured to form a time-evolution Boltzmann machine that predicts input data at one time point on the basis of the input data sequence and hidden node values.

The learning apparatus 100 is able to learn the model by computing a conditional probability of the input value $x_j^{[9]}$ at the one-time point occurring, based on the input value $x^{(−T, −1]}$, which is a history, for a model that takes time evolution into consideration. Furthermore, since the learning apparatus 100 learns the model using hidden nodes in addition to the time-series input data, the expressive ability and learning ability can be improved.

A description has been given of the learning apparatus 100 according to an embodiment that sequentially acquires new input data from time-series input data and adjusts the weight parameter for each input data acquired. Instead of this configuration, the learning apparatus 100 can acquire time-series input data of a predetermined duration and then adjust the weight parameters. For example, the learning processing section 150 adjusts the weight parameters collectively for a plurality of time points in response to acquisition of new input data at a plurality of time points corresponding to D layers.

Figure 4:
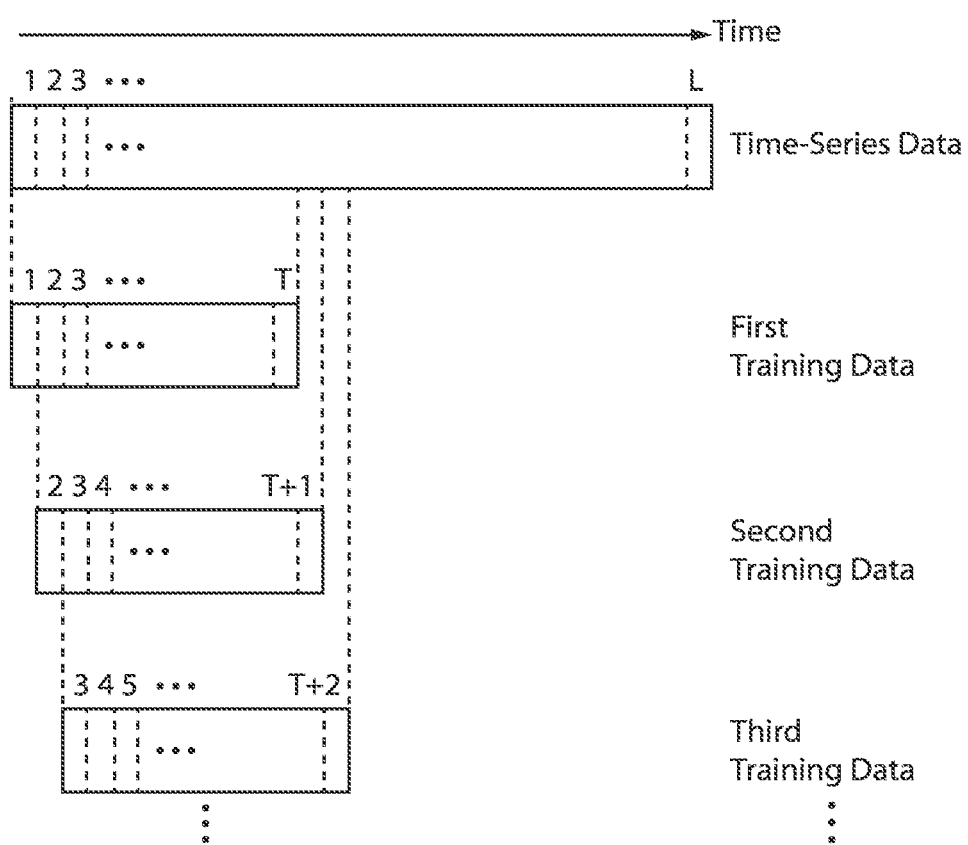
FIG. 4 shows an example of structures of time-series data and training data for use in learning in an embodiment.

FIG. 4 shows an example of structures of time-series data and training data for use in learning in an embodiment. In FIG. 4, the horizontal axis denotes time. FIG. 4 shows an example in which the learning apparatus 100 uses time-series data $y^{[1,L]}$ having a duration L that is longer than a duration T of time-series data $y^{[1, T]}$ used as training data by the learning apparatus 100 during learning. In this case, the learning processing section 150 can be configured to adjust weight parameters for a plurality of time points all together, in response to input data at a plurality of time points being newly acquired.

The learning apparatus 100 first performs learning using, as first training data, a time-series data segment of the time-series data from a time 1 to a time T. In this case, as described in FIG. 3, the learning apparatus 100 can perform learning by setting the time-series data and corresponding hidden layer values from the time 1 to the time T as each input value of the common layer 12 at the one time point in order, and incrementally shifting the time points one at a time toward the future. The learning apparatus 100 can use data at a time T as each input value $x_j^{[0]}$ at the one-tune point, and continue learning until the time-series data from the time 1 to a time T−1 becomes the input data sequence $x^{(−T, −1]}$ (e.g., the history).

Next, the learning apparatus 100 performs learning using, as second training data, a time-series data segment of the time-series data from a time 2 to a time T+1. The learning apparatus 100 can sequentially use each of D pieces of data in the second training data as the input value $x_j^{[0]}$ at the one-time point. In this case, the learning apparatus 100 can shift the time point in the interval from the time 2 to the time T+1 one time point at a time toward the future and use, as the history, the corresponding time-series data and hidden nodes of the interval from the time 2 to the time T. In this way, the learning apparatus 100 can adjust the parameters D times for the D input values $x_j^{[0]}$ and the corresponding D histories. That is, the learning apparatus 100 can use a stochastic gradient technique in which the learning method described with Expressions 8 to 11 is performed.

Alternatively, the learning apparatus 100 can acquire D time-series data sets, generate a plurality of training data sets from time-sequence data segments of a duration of L, and collectively perform learning for D layers. Specifically, the learning apparatus 100 can perform the stochastic gradient technique described using Expressions 8 to 11 collectively for D layers, by using the following expression.

$$\theta \leftarrow \theta + \eta \Sigma_{x \in \{y^{(t,t+T-1]}\}_{0 \le t < D}} \nabla_\theta \log P_\theta(x_{[1,T]}^{[0]}|x^{(−T,−1]}) \quad \text{Expression 12}$$

Figure 5:
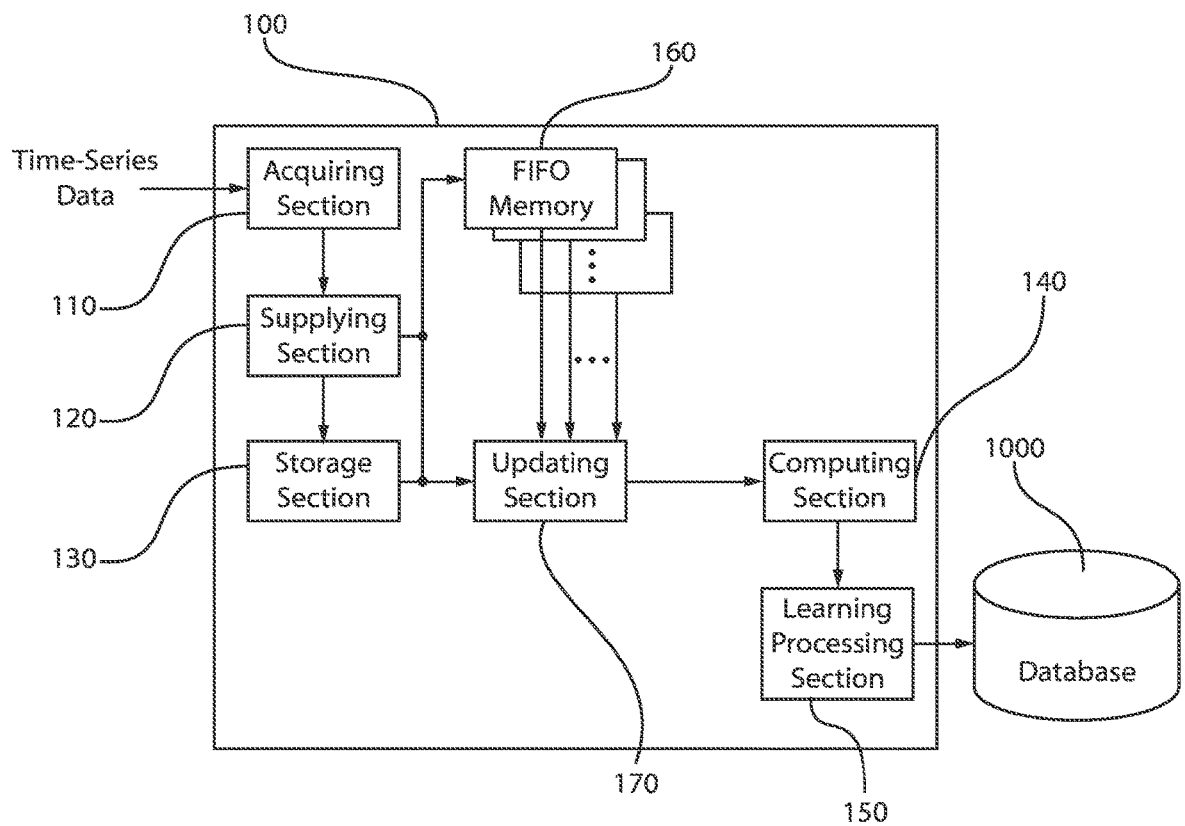
FIG. 5 shows a first modification of the learning, apparatus according to an embodiment.

FIG. 5 shows a first modification of the learning apparatus 100 according to an embodiment. Components of the learning apparatus 100 shown in FIG. 5 that perform substantially the same operations as those of the learning apparatus 100 according to the embodiment illustrated in FIG. 1 are denoted by the same reference numerals, and a description thereof is omitted. In a case where time-series data of a duration L, such as described in FIG. 4, is provided, the learning apparatus 100 according to the present modification can be configured to efficiently update parameters by using FIFO memories and learn a model corresponding to the time-series input data. The learning apparatus 100 according to the present modification further includes FIFO memories 160 and an updating section 170.

Each of the FIFO memories 160 can sequentially store input data and output the stored data after a predetermined number of storages have been performed. Each of the FIFO memories 160 can be a memory that first outputs data that has been stored first (e.g., FIFO: First In, First Out).

Each of the FIFO memories 160 can sequentially store an input value of the common layer 12 and output the input value after a predetermined number of storages have been performed. The learning apparatus 100 can include a plurality of FIFO memories 160, the number of which is greater than or equal to the number of nodes n of the model. The plurality of FIFO memories 160 is desirably provided to have a one-to-one correspondence with the plurality of nodes of the common layer 12. That is, each of the plurality of FIFO memories 160 can be provided in a manner to store a history for a respective node of the common layer 12 or to update the history thereof.

The plurality of FIFO memories 160 are connected to the acquiring section 110 and the storage section 130, and sequentially store input values corresponding to new input data of the common layer 12. The plurality of FIFO memories 160 are also connected to the updating section 170 and sequentially supply the data stored therein to the updating section 170.

The updating section 170 can be configured to update a plurality of update parameters that are based on the hidden nodes and the input data sequence of the time-series input data before the one time point, from values at a prior time point to values at the one time point, on the basis of values of the update parameters and values of the hidden nodes and input values corresponding to the input data to be reflected next. The updating section 170 can update the update parameters by using values input to the FIFO memories 160 and values output from the FIFO memories 160, The updating section 170 can be connected to the acquiring section 110 and the storage section 130, and can receive values input to the FIFO memories 160. Alternatively, the updating section 170 can receive values input to the FIFO memories 160 from the acquiring section 110 via the supplying section 120.

Here, the update parameters are $\alpha_{i,j,k}$ and $\gamma_{i,l}$ shown in Expressions 5 and 7. In this case, the update parameters are based on input values $i(1 \le i \le I)$ corresponding to input data of the input data sequence at each time point and the predefined parameters $\lambda_k^{t1}$ and $\mu_l^{t2}$ of the weight parameter $W_{ij}^{[\delta]}$ between this input value i and the target input node $j(1 \le j \le I)$ or hidden node $j(I+1 \le j \le I+H)$, for example. As another example, the update parameters are based on the hidden node i $(I+1 \le i \le I+H)$ at each time point and the predefined parameters $\lambda_k^{t1}$ and $\mu_l^{t2}$ of the weight parameter $W_{ij}^{[\delta]}$ between this hidden node i and the target input node j $(1 \le j \le I)$ or hidden node $j(I+1 \le j \le I+H)$, for example.

The update parameters can be updated every time the acquisition of the time-series input data by the acquiring section 110 and the storage of the sampling values by the storage section 130 are performed sequentially. The above-described learning apparatus 100 according to the present modification can be configured to learn a modification of the model 10. The modification of the model 10 is described with reference to FIG. 6.

Figure 6:
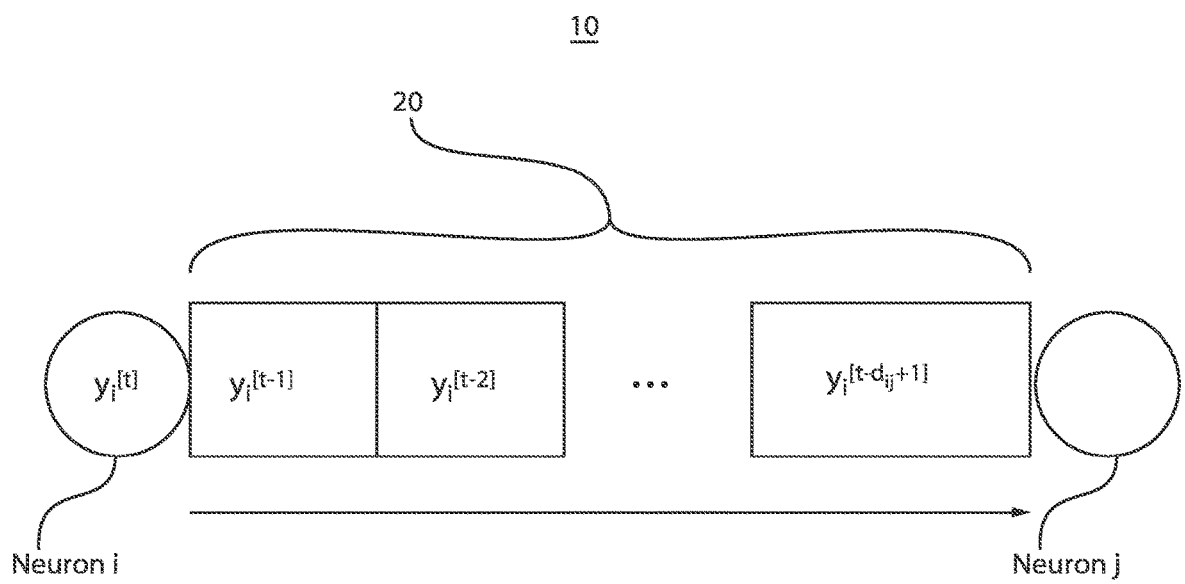
FIG. 6 shows a modification of the model, according to an embodiment.

FIG. 6 shows a modification of the model 10 according to an embodiment. The model 10 according to the modification needs not have the layered structure including T layers shown in FIG. 2. FIG. 6 shows an example of a model 10 corresponding to one of the FIFO memories 160. Accordingly, the overall configuration of the model 10 according to the present modification includes a storage area that is equivalent to the 0-th common layer in FIG. 2 including the training data, and a number of the configurations illustrated in FIG. 6 equal to the number of nodes n (=I+H). Neurons i and j and a FIFO sequence 20 of the model 10 according to the present modification are described below.

The i can be equivalent to the input terminal of the FIFO memory 160. An input value $y_i^{[t]}$ ($1 \le i \le I$) of each node in the input data of the input data sequence at each time point t and a corresponding value $y_i^{[t]}$ among the values $y_i^{[t]}$ ($I+1 \le i \le I+H$) of the hidden nodes at each time point are sequentially input to the neuron i. The neuron i can set the value $y_i^{[t]}$ input thereto as the current input value. Then, at a time point t+1, the neuron i can supply the input value $y_i^{[t]}$ input at the time point to the updating section 170 and to the FIFO sequence 20 as the previous input value and can hold the input value $y_i^{[t+1]}$ at the time point t+1 as the current input value.

The FIFO sequence 20 can store $d_{ij}-1$ of the latest input values received from the neuron i. The FIFO sequence 20 can supply the $d_{ij}-1$ input values stored therein to the updating section 170. The updating section 170 can be configured to compute the values of the update parameters denoted by Expression 6 by using the input values supplied by the FIFO sequence 20. If the FIFO sequence 20 holds input values from the time point t−1 to the time point t−$d_{ij}$+1, the FIFO sequence 20 is denoted by the following expression.

$$q_{i,j} \equiv (y_i^{[t-1]}, y_i^{[t-d_{ij}+2]}, y_i^{[t-d_{ij}+1]}) \qquad \text{Expression 13}$$

After the input value $y_i^{[t1]}$ is input to the neuron i at the time point t1, the FIFO sequence 20 can store the input value $y_i^{[t1]}$ up until a time point t3 (=t1+$d_{ij}$−1) which is a predetermined time period $d_{ij}$−1 after the next time point t2 (=t1+1) of the time point t1. At the next time point t4 (=t3+1=t1+$d_{ij}$), the FIFO sequence 20 can supply the input value $y_i^{[t1]}$ to the neuron j. The input value $y_i^{[t1]}$ supplied to the neuron j at the time point t4 is immediately supplied to the updating section 170 at the time point t4. However, the input value $y_i^{[t]}$ that the neuron j has received from the FIFO sequence 20 at the time point t4 does not serve as an input for the neuron j, and the input value $y_i^{[t4]}$ can be input to the neuron j at the time point t4.

The neuron j can be equivalent to the output terminal of the FIFO memory 160, and the neuron j can receive the input value $y_i^{[t1]}$ input to the neuron i at the time point t1, via the FIFO sequence 20 after the time period $d_{ij}$, e.g., at the time point t1+$d_{ij}$. That is, the model 10 from the neuron i to the neuron j via the FIFO sequence 20 can correspond to the FIFO memory 160 that stores do pieces of input data. In addition, the neuron i of the model 10 according to the modification can correspond to, for example, a node for an input data sequence such as a node i of the (−δ)-th common layer of the model 10 shown in FIG. 2, and in this case the neuron j can correspond to, for example, the node j of the 0-th common layer. At the time point t1+$d_{ij}$, the neuron j can supply the received input value $y_i^{[t1]}$ to the updating section 170.

As described above, the model 10 according to the present modification can supply the input values at the time point t−1 and the time point t−$d_{ij}$+1 to the updating section 170 at the time point t. In this way, the updating section 170 can update the update parameters by adding the corresponding input value in the input data to be reflected next to the update parameters for the time point before the one time point, and then multiplying the resulting sum by a predetermined constant. Note that the update parameters denoted by Expression 8 can be computed in accordance with Expression 8 by using the input values stored in the FIFO sequence 20 that are supplied to the updating section 170.

For example, the update parameter $\gamma_{i,l}$ denoted by Expression 7 can be updated by using the input values supplied to the updating section 170 and the second predefined parameter.

Specifically, the updating section 170 can compute the update parameter $\gamma_{i,l}$ to be used in the current learning by performing computing at the time point t according to the following expression by using the prior update parameter $\gamma_{i,l}$ and the input value $y_i^{[t-1]}$ received from the neuron i at the time point t.

$$\gamma_{i,l} \leftarrow \mu_l(\gamma_{i,l} + y_i^{[t-1]}) \qquad \text{Expression 14}$$

Figure 7:
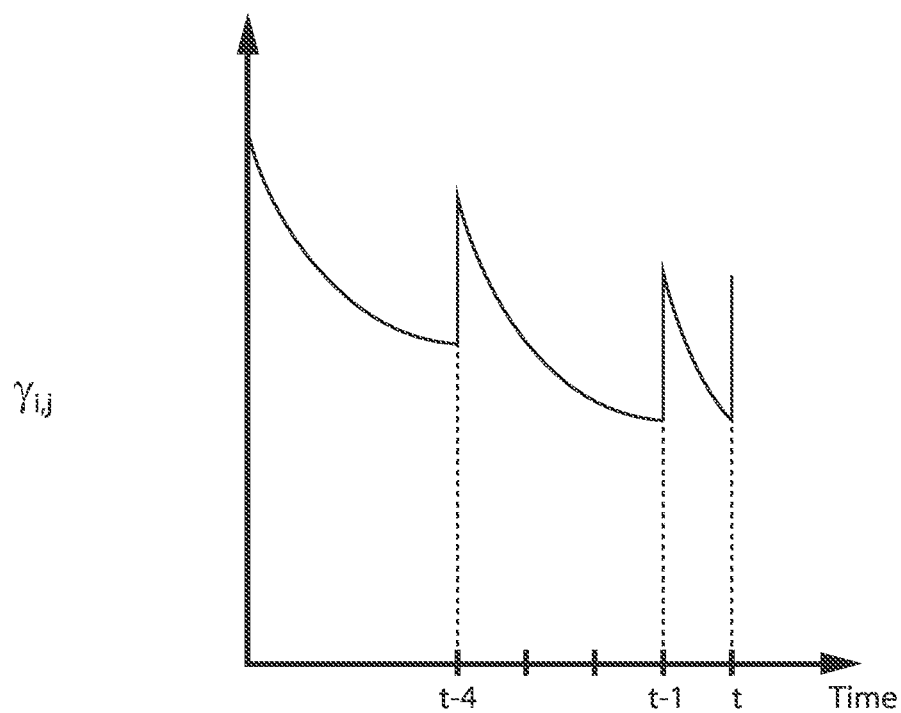
FIG. 7 shows an example of a temporal change in the update parameter $\gamma_{i,l}$ according o an embodiment.

FIG. 7 shows an example of a temporal change in the update parameter $\gamma_{i,l}$ according to the present embodiment. FIG. 7 shows an example in which values greater than 0 (for example, 1) are input to the neuron i as the input value at time points t−5, t−2, and t−1, and these input values are supplied to the updating section 170 at time points t−4, t−1, and t. The second predefined parameter $\mu_l$ is a parameter whose value gradually decreases as the time point difference increases. Accordingly, the update parameter $\gamma_{i,l}$ computed by the updating section 170 tends to decrease as time passes from when the input value of 1 is input to when the next input is given.

The update parameter $\alpha_{i,j,k}$ denoted by Expression 5 can be updated by using the input values supplied to the updating section 170 and the first predefined parameter $\lambda_k$. Specifically, the updating section 170 can compute the update parameter $\alpha_{i,j,k}$ to be used in the current learning by performing computing at the time point t according to the following expression, by using the prior update parameter $\alpha_{i,j,k}$ and the input value $y_i^{[t-d_{ij}]}$ received from the neuron j at the time point t.

$$\alpha_{i,j,k} \leftarrow \lambda_k(\alpha_{i,j,k} + y_i^{[t-d_{ij}]}) \qquad \text{Expression 15}$$

Figure 8:
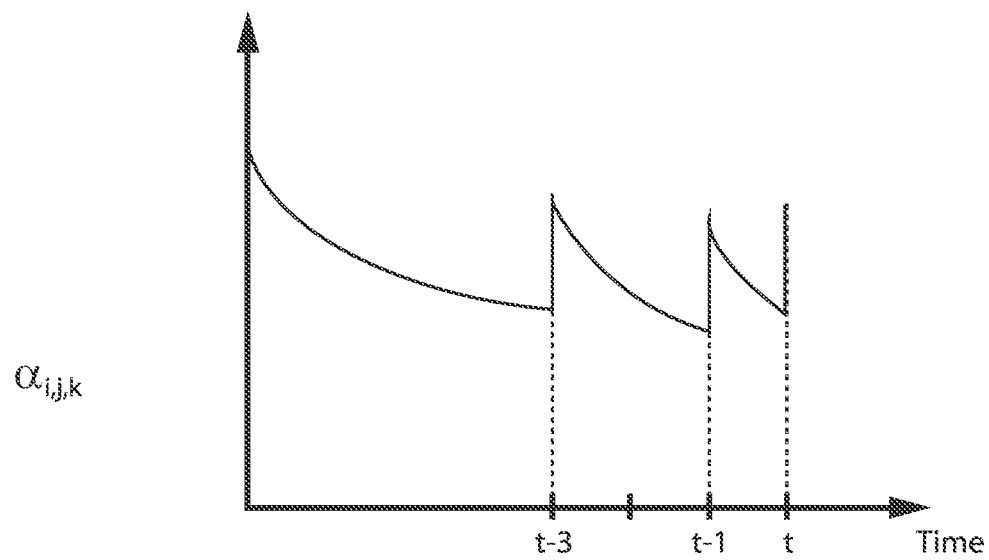
FIG. 8 shows an example of a temporal change in the update parameter $\alpha_{i,j,k}$ according to an embodiment.

FIG. 8 shows an example of a temporal change in the update parameter $\alpha_{i,j,k}$ according to the present embodiment. FIG. 8 shows an example in which values greater than 0 (for example, 1) are supplied to the neuron j as the input value at time points t−3, t−1, and t. The first predefined parameter $\lambda_k$ is a parameter whose value gradually decreases as the time point difference increases. Accordingly, the update parameter $\alpha_{i,j,k}$ computed by the updating section 170 tends to decrease as time passes from when the input value of 1 is input to when the next input is given.

As described above, the learning apparatus 100 according to the present modification can update the update parameters $\alpha_{i,j,k}$ and $\gamma_{i,l}$ by applying the model 10 shown in FIG. 6 using the FIFO memories 160 and the updating section 170. Note that the updating section 170 can apply the model 10 according to the present modification, for example, by acquiring the input values $x_i^{[t-1]}$ at the time point t−1 from the input data input to the FIFO memories 160 and acquiring the input values $x_i^{[t-d_{ij}]}$ at the time point t−$d_{ij}$ from the output of the FIFO memories 160.

In addition, the learning apparatus 100 can update the parameter $\beta_{i,j,l}$ through substantially the same operation as the operation described in FIG. 3, Specifically, the computing section 140 can compute the parameter $\beta_{i,j,l}$ by determining the sum of products of the second predefined parameter $\mu_l$ and the input value $x_i$ ($y_i$ in the present modification) for time points from t−1 to t−$d_{ij}$+1 as indicated by Expression 6.

In this way, the computing section 140, according to the present modification, can compute, by using the plurality of update parameters, conditional probabilities of input data values at one time point on the condition that the hidden node values and input data sequence have occurred. Then, the learning processing section 150 can determine the learning parameters $u_{i,j,k}$ and $v_{i,j,l}$ and the bias parameter $b_j$ by performing substantially the same operation as the operation described in FIG. 3.

In other words, the learning apparatus 100, according to the present embodiment, can determine the weight parameter and bias parameters in a manner increase the probability of predicting the input value to be input to the input layer 14 of the common layer 12, based on the past values that have been input to the common layer 12 of the model 10 before the one time point. Furthermore, the learning apparatus 100 can improve the prediction accuracy, the expressive ability, the learning efficiency, and the like of the input values input to the input layer 14 by having the common layer 12 include the hidden layer 16 in addition to the input layer 14.

The learning apparatus 100, according to the present embodiment described above, is an example in which a value that is unrelated to the prediction made by the learning apparatus 100 is sampled and input as the hidden node value to be input to the hidden layer 16. Instead, the learning apparatus 100 can determine the hidden node value by using a history of the conditional probability of the values of the nodes of the common layer 12. The learning apparatus 100 can determine the weight parameter to a hidden node using this conditional probability history. The learning apparatus 100 can improve the prediction accuracy by using the conditional probability history of nodes of the cola on layer 12 to determine the weight parameter to the hidden node and the hidden node value.

In this case, the computing section 140 can compute the conditional probability $p_{j,t}$ of the value of a node j of the common layer 12 at one time point t based on the values input to the corresponding node j of the common layer 12 at each time point before the one time point t, and store this conditional probability in the storage section or the like. In addition to the computation of the conditional probability of each input value of the input layer 14 at the one time point described above, the computing section 140 can compute the conditional probability of each hidden node in the layer 16 at the one time point in the same manner. That is, the computing section 140 can use the plurality of update parameters to compute the conditional probability of the value of each hidden node and each input data value at the one time point on the condition that an input data sequence has occurred. Here, the computing section 140 can store the conditional probability $p_{j,t}$ in a FIFO or the like.

The computing section 140 can be configured to compute a total likelihood, after the learning by the learning apparatus 100 has continued. The computing section 140 computes the total likelihood $p_j$ as shown in the following expression, based on the conditional probabilities $p_{j,t-K+1}$, $p_{j,t-K+2}$, ..., $p_{j,t}$ computed by K instances of learning from the time point t−K+1 to the time point t, for example. The total likelihood $p_j$ in Expression 16 indicates a total sum of the conditional probabilities, as an example, but the total likelihood $p_j$ can be at least one of a sum, weighted sum, product, or weighted product of the conditional probabilities. Furthermore, K can be an integer greater than or equal to 2, and if the computing section 140 stores the conditional probabilities $p_{j,t}$ in a FIFO or the like, the length of the FIFO sequence can be equal to the value of K.

$$p = \Sigma_{s=t-K+1}^{t} p_s \qquad \text{Expression 16}$$

The computing section 140 can supply the total likelihood $p_j$ to the storage section 130. The storage section 130 can sample the values $x_j^{[t]}$ of the hidden nodes of the hidden layer 16 at the one time point, based on the most recent likelihood $p_{j,t}$. That is, the storage section 130 according to the present embodiment can be configured to sample the value of each hidden node at the one time point, by using the conditional probability of the value of each hidden node at the one time point. For example, the storage section 130 samples the values of the hidden nodes based on the history of the conditional probabilities computed by the computing section 140. That is, the storage section 130 can sample the values of the hidden nodes after the learning operation of the learning processing section 150 has been performed a plurality of times. The storage section 130 can store a value of 0 in the hidden nodes as the sampling value, until the learning operation of the learning processing section 150 has been performed a plurality of times.

The storage section 130 can store a value of 1 or 0 in the hidden node j as the sampling result, according to the result of a comparison between the value of the total likelihood $p_j$ and a threshold value. In this way, when predicting the time series data to be input to the input layer 14, the storage section 130 can store a more preferable value as the hidden node value by performing sampling based on the history of past conditional probabilities.

The learning processing section 150 can be configured to determine the weight parameter based on the total likelihood $p_j$. In this case, the learning processing section 150 can compute update amounts $\Delta u_{i,j,k}$ and $\Delta v_{i,j,k}$ for the learning parameters $u_{i,j,k}$ and $v_{i,j,k}$ in the weight parameter for one hidden node j at the one time point. For example, the learning processing section 150 can compute these update amounts $\Delta u_{i,j,k}^{[t]}$ and $\Delta v_{i,j,k}^{[t]}$ as shown in the following expression, based on the value $x_j^{[t]}$ of the one hidden node j at the one time point t and on the conditional probability $\langle X_j^{[t]} \rangle$ of the value of this hidden node j at the one time point t on the condition that the input data sequence has occurred (I+1≤j≤I+H).

$$\Delta u_{i,j,k}^{[t]} = \alpha_{i,j,k}^{[t-1]}(x_j^{[t]} - \langle X_j^{[t]} \rangle)$$

$$\Delta v_{i,j,l}^{(1)[t]} = \beta_{i,j,l}^{[t-1]}(\langle X_j^{[t]} \rangle - x_j^{[t]})$$

$$\Delta v_{i,j,l}^{(2)[t]} = \gamma_{i,j,l}^{[t-1]}(\langle X_j^{[t]} \rangle - x_j^{[t]}) \qquad \text{Expression 17}$$

Here, the update amount $\Delta v_{i,j,k}^{[t]}$ is equal to $\Delta u_{i,j,k}^{(1)[t]} + \Delta u_{i,j,k}^{(2)[t]}$. The conditional probability $\langle X_j^{[t]} \rangle$ of the value of the hidden node j can be computed by the computing section 140 using Expression 2. The learning processing section 150 can store the computed update amounts $\Delta v_{i,j,k}^{[t]}$, $\Delta u_{i,j,k}^{(1)[t]}$, and $\Delta u_{i,j,k}^{(2)[t]}$ in the storage section or the like. The learning processing section 150 can be configured to store the update amounts $\Delta v_{i,j,k}^{[t]}$, $\Delta u_{i,j,k}^{(1)[t]}$, and $\Delta u_{i,j,k}^{(2)[t]}$ computed for one time point in the FIFO sequence. That is, the learning processing section 150 can be configured to update the learning parameters based on update amounts computed in the past.

The learning processing section 150 changes the ratio by which the update amounts are reflected in the learning parameters, according to the conditional probability of input data occurring at a following time point that is after the one time point t, for example. In this case, the learning processing section 150 can change the ratio by which the update amounts are reflected in the learning parameters according to the conditional probability of a hidden node value occurring at a plurality of following time points that are after the one time point. In the present embodiment, an example is described in which the learning processing section 150 changes the ratio by which the update amounts are reflected in the learning parameters according to the total likelihood $p_j$ after the one-time point.

The learning processing section 150 can update the learning parameters as shown in the following expression, based on the total likelihood $p_j$ computed by K instances of learning from the time point t−K+1 to the time point t and on the update amount at the time point t−K+1, for example. Here, K can be an integer greater than or equal to 2, and if the learning processing section 150 stores the update amounts in the FIFO sequence, the length of the FIFO sequence can be equal to the value of K.

$$u_{i,j,k} \leftarrow u_{i,j,k} + \eta_1 p_j \Delta u_{i,j,k}[t-k+1]$$

$$v_{i,j,l} \leftarrow v_{i,j,l} + \eta_1 p_j (\Delta v_{i,j,l}^{(1)[t-k+1]} + \Delta v_{i,j,l}^{(2)[t-k+1]}) \qquad \text{Expression 18}$$

Here, $\eta_1$ can be a constant for adjusting the update amount. Alternatively, $\eta_1$ can be a coefficient whose value becomes smaller according to an increase in the number of updates. Yet further, $\eta_1$ can have a value of substantially 1 at the stage when the learning processing section 150 begins learning, and can be a coefficient whose value becomes smaller according to the amount of learning occurring as time progresses from the time point t. For example, $\eta_1 = \eta_{10}/t^2$. Furthermore, $\eta_1$ can be a coefficient whose value becomes smaller according to the update amount. For example, $\eta_1 = \eta_{10}/(\Sigma \Delta u_{i,j,k}^2)^{1/2}$. Here, $\eta_{10}$ can be a predetermined constant.

In the manner described above, the learning processing section 150 can update the learning parameters of a hidden node at one time point according to the conditional probabilities computed at time points before the one time point. In this way, the learning apparatus 100 can more strongly reflect the update amounts at time points before the one time in the learning parameters, in response to the predicted probability of an input value of an input node being large due to the weight parameters at time points before the one time point. That is, the learning apparatus 100 can update the weight parameters of the hidden nodes in a manner to increase the conditional probabilities.

If a FIFO sequence is used to perform an update of such a weight parameter, the learning processing section 150 can extract from the FIFO sequence the update amounts $\Delta v_{i,j,k}^{[t-K+1]}$, $\Delta u_{i,j,k}^{(1)[t-K+1]}$, and $\Delta u_{i,j,k}^{(2)[t-K+1]}$ of a past time point (e.g., t−K+1) at the following time point (e.g., t) or a time point thereafter. The learning processing section 150 can update the ratio by which the update extracted from the FIFO sequence are reflected in the learning parameters according to the conditional probabilities of hidden node values occurring at the following time point t. For example, the learning processing section 150 can multiply the total likelihood $p_j$ respectively by each update amount. In this way, the learning processing section 150 can efficiently perform the update of the weight parameters as described above.

Figure 9:
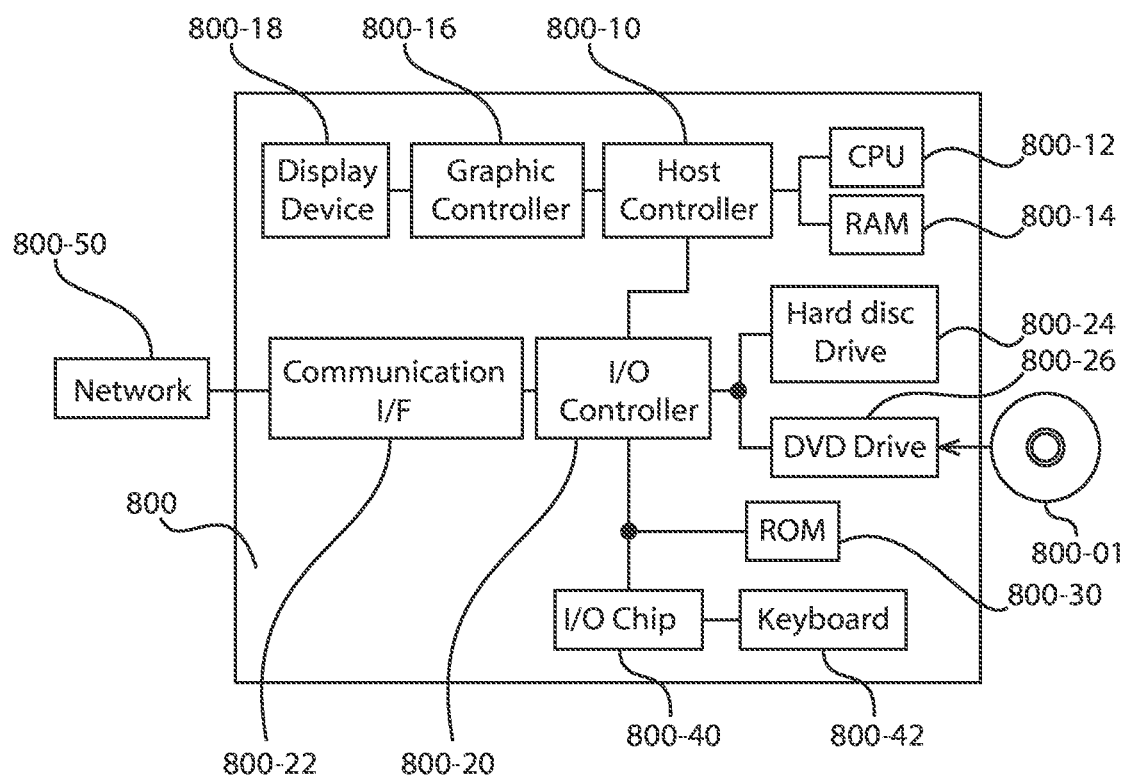
FIG. 9 shows a exemplary hardware configuration of a computer, according to an embodiment of the present invention.

FIG. 9 shows an example of a computer 800 in which aspects of the present invention can be wholly or partly embodied. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program can be executed by the CPU 800-12 to cause the computer 800 to perform certain operations associated with some or all of the blocks of flowcharts and block diagrams described herein.

The computer 800, according to the present embodiment, includes a CPU 800-12, a RAM 800-14 a graphics controller 800-16, and a display device 800-18, which are mutually connected by a host controller 800-10. The computer 800 also includes input/output units such as a communication interface 800-22, a hard disk drive 800-24, a DVD ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 can also connect various input/output units via a parallel port, a serial port, a keyboard port, a mouse port, and the like to the input/output controller 800-20.

A program is provided by computer readable media, such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the abovementioned various types of hardware resources. An apparatus or method can be constituted by realizing the operation or processing of information in accordance with the usage of the computer 800.

For example, when communication is performed between the computer 800 and an external device, the CPU 800-12 can execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 can cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 can then write back the processed data to the external recording medium.

Various types of information, such as various types of programs, data, tables, and databases, can be stored in the recording medium to undergo information processing. The CPU 800-12 can perform various types of processing on the data, read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14. In addition, the CPU 800-12 can search for information in a file, a database, etc., in the recording medium. For example, when a plurality of entries, each having an attribute value of a first attribute is associated with an attribute value of a second attribute, are stored in the recording medium, the CPU 800-12 can search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules can be stored in the computer readable media, on or near the computer 800. In addition, a recording medium, such as a hard disk or a RAM provided in a server system connected to a dedicated communication network or the Internet, can be used as the computer readable media, thereby providing the program to the computer 800 via the network.

FIG. 10 shows a framework for predicting a higher-order moment of a time-series dataset, according to an embodiment of the present invention.

The equations 502, 504, 506 below allow for the extension of Boltzmann machines to larger classes of distributions, such as non-Gaussian distributions pertaining to financial data.

For Boltzmann machines dealing with Gaussian distributions, an assumption is that $$p(x^{[t]} \mid x^{[t-T,t-1]}) = \prod_{j=1}^{N} p_j(x_j^{[t]} \mid x^{[t-T,t-1]})$$

where x is a series of patterns, t is time, N is a number of layers, T is layers of units, and i, j are units in layers.

$$p_j(x_j^{[t]} \mid x^{[t-T,t-1]}) = \frac{1}{\sqrt{2\pi\sigma_j^2}} \exp\left(-\frac{(x_j^{[t]} - \mu_j^{[t]})^2}{2\sigma_j^2}\right)$$

where σ is a variance, μ is an expected value, x is a series of patterns, t is time, and T is layers of units, and i, j are units in layers.

For Boltzmann machines dealing with Gaussian distributions, a prediction is that:

$$\mu^{[t]} = b + \sum_{\delta=1}^{d-1} W_\delta x^{[t-\delta]} + \sum_{k=1}^{K} U_k \sum_{\delta=d}^{\infty} \lambda_k^{(\delta-d+1)} x^{[t-\delta]}$$

where b is a bias, w is a weight, d is a conduction delay, K are column vectors, U is a learning parameter, t is time, and δ is a time point difference.

In one embodiment(Model A), the framework for the Generalized Auto-Regressive Conditional Heteroskedasticity (GARCIA) can be given as:

$$x_t = \mu + \sigma_t \epsilon_t, \; \epsilon_t \sim N(0, 1)$$

$$\sigma_t^2 = a_0 + \sum_{i=1}^{p} a_i(x_{t-i} - \mu)^2 + \sum_{j=1}^{q} b_j \sigma_{t-j}^2$$

Where $\sigma$ is a variance, t is time, x is a series of patterns, $\mu$ is an expected value, $\epsilon$ is a noise that is assumed to follow Normal distribution, b is a bias, a is an eligibility trace, and i, j are units in layers.

In another embodiment (Model B), the framework for the Generalized Auto-Regressive Conditional Heteroskedasticity (GARCH) can be given as:

$$\sigma_t^2 = v_0 + w_1 e_{t-1}^2 + u_1 \sum_{i=d+1}^{\infty} \lambda_1^{i-d} e_{t-i}^2$$

Where $\sigma$ is a variance, t is time, w is a weight, v is a learning parameter, $\lambda$ is a decay rate, d is a conduction delay, is the square of the prediction error of DyBM for Gaussian Distribution, u is a learning parameter, and i, j are units in layers.

The combination of a Generalized Auto-Regressive Heteroskedasticity (GARCH) model with a dynamic Boltzmann machine (DyBM) can be employed for predicting the second-order moment of time-series datasets. In Model A, methods are employed for obtaining the parameters of GARCH from the means estimated by the DyBM. In Model B, methods are employed to use the DyBM's eligibility traces to predict time-varying variances. Model B is more general than Model A. That is to say that any parameters in Model A can be simulated by Model B, but not vice versa. As a result, for particular time-series datasets, such as those in financial markets, the volatility is varied in time. These volatility measures are often derived from the second-order moment of the time-series. Sudden drops of price indices often correspond to high volatility. To predict such market turbulences, predicting the time-varying volatility can be beneficial. Such time-varying volatility can be accurately determined by predicting the time-varying second-order moment of the time-series datasets. The models above employ GARCH to predict such time-varying second-order moment of the time-series datasets in combination with the DyBM (predicting first-order moments).

In Equation 504, Method A utilizes DyBM for Gaussian Distribution to predict the first-order moment (or mean) value $\mu$ assuming that the time-series datasets are generated from distributions that follow the Gaussian Distribution. By this assumption, DyBM can be used to efficiently predict the time-varying first-order moment as in Equation 502. However, different from DyBM for Gaussian Distributions, Method A predicts the second-order moment (or variance) value $(\sigma_t)^2$ that varies with time. The second-order moment is predicted according to the second line of Equation 504, that is, its value at time t is determined by the GARCH(p,q) Method A from the linear combination of p most-recent squares of the prediction errors of DyBM for Gaussian Distribution and q most-recent prediction of second-order moments, which is shifted by the constant $a_0$, which is learnt from the dataset.

In Equation 506, Method A utilized DyBM for Gaussian Distribution to predict the first-order moment (or mean) value $\mu$ assuming that the time-series datasets are generated from distributions that follow the Gaussian Distribution. By this assumption, DyBM can be used to efficiently predict the time-varying first-order moment as in Equation 502. However, different from DyBM for Gaussian Distributions, Method B predicts the second-order moment (or variance) value $(\sigma_t)^2$ that varies with time. The second-order moment is predicted according to the Equation 506, that is, its value at time t is determined by the GARCH(d,k) Method B from the linear combination of d most-recent squares of the prediction errors of DyBM for Gaussian Distribution and k different modes of the weighted sums of the rest of squares of prediction errors of DyBM for Gaussian Distribution, which is shifted by the constant $v_0$, which is learnt from the dataset.

Figure 11:
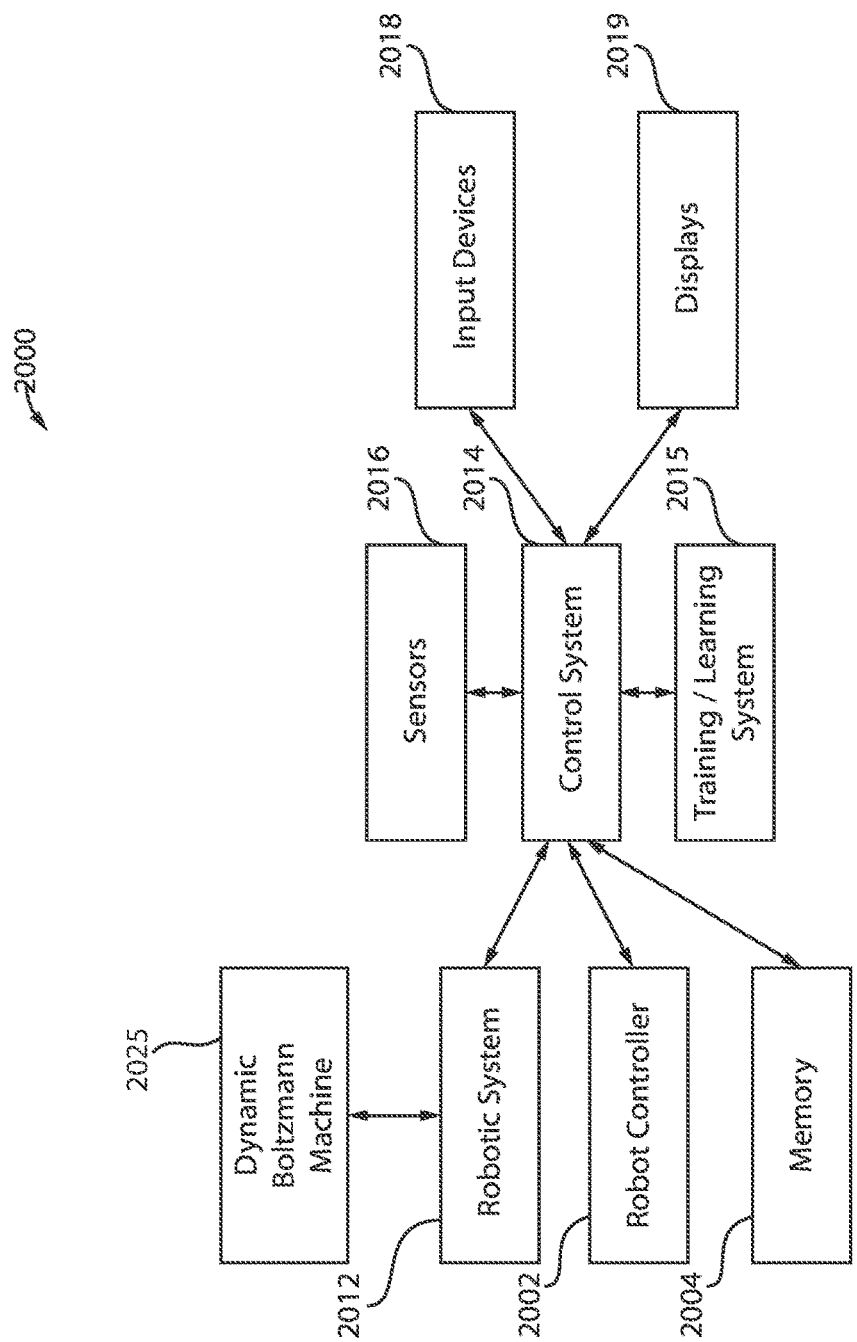
FIG. 11 is a block/flow diagram of an exemplary robotic system employing the Boltzmann machine equations of FIG. 10, in accordance with an embodiment of the present invention.

FIG. 11 is a block/flow diagram of an exemplary robotic system employing the Boltzmann machine equations of FIG. 10, in accordance with an embodiment of the present invention.

The block diagram 2000 depicts a robotic system 2012 in communication with a control system 2014, the robotic system 2012 controlled by a dynamic Boltzmann machine 2025. The robotic system 2012 can include one or more robots. The control system 2014 is in communication with a training/learning system 2015 and sensors 2016. The control system 2014 further communicates with input devices 2018 and displays 2019.

In one exemplary embodiment, control system 2014 includes a dedicated robot controller and a data processing unit or controller 2002. The robot controller and the input devices 2018 can be communicatively coupled to the data processing controller. In one exemplary embodiment, the robot controller operates the robotic system 2012 based on data provided by the data processing controller, which receives control input from another system or device, e.g., input devices 2018 and training/learning system 2015. The training/learning system 2015 can adjust operating conditions of the robotic system 2012 in order for the robotic system to perform at an optimal level based on the dynamic Boltzmann machine 2025 employing equations 502, 504, 506 in FIG. 10.

Control system 2014 can be microprocessor-based and the program instructions executed thereby are in the form of software stored in a memory 2004. However, it is alternatively contemplated that any or all of the controllers and program instructions can be in the form of any combination of software, firmware and hardware, including state machines, and can reflect the output of discreet devices and/or integrated circuits, which can be co-located at a particular location or distributed across more than one location, including any digital and/or analog devices configured to achieve the same or similar results as a processor-based controller executing software and/or firmware and/or hardware based instructions.

In some embodiments, robotic system 2012 can include one or more sensors 2016, e.g., for use in operating robotic system 2012 locally or remotely, for enhancing safety, and/or for other purposes. Sensors 2016 can take any suitable form, e.g., including vision sensors such as cameras, acoustic sensors, infrared sensors or one or more other types of proximity sensors, microphones, position sensors, translational and rotational speed sensors, force sensors and/or any other types of sensors. Sensors 2016 are communicatively coupled to control system 2014. In some embodiments, control system 2014 can include a controller communicatively coupled to one or more sensors 2016 for processing the output of one or more sensors 2016.

In one exemplary embodiment, input device 2018 is a joystick. In other embodiments, input device 2018 can take other forms, e.g., a stylus. Input device 2018 can be constructed to allow the user to control or initiate the motions or movements of robotic system 2012, e.g., via control system 2014. In some embodiments, input device 2018 can be constructed to control or initiate a position, direction and/or speed of rotational and translational motion of robotic system 2012, e.g., an end effector based on feedback received from the training/learning system 2015.

In some embodiments, robotic system 2012 includes one or more display devices 2019 communicatively coupled to the data processing controller of control system 2014. In one exemplary embodiment, display devices 2019 are also input devices, e.g., a touch screen display. Display devices 2019 display, for example, robot motion data, and can be employed to adjust or fine-tune parameters or variables to obtain best operating conditions based on the training/learning system 2015.

The training/learning system 2015 learns how to better understand the physical interaction model and to perform the robotic task. The physical interaction model relates to, e.g., exchanged forces and/or moments between the robotic system 2012 and the environment. Thus, the memory based system is trained by using reinforcement learning. Reinforcement learning is conducted by choosing or selecting an action among decomposed actions and assembly movement actions at each step of the positional search process based on, e.g., corresponding force-torque data received from at least one sensor 2016 associated with the robotic system 2012.

Reinforcement learning problem setting can be considered as follows:

The robotic system 2012 observes the environmental state to decide an action the robotic system 2012 wishes to take. The environment can change according to a certain rule and a human can change the environment by his or her own action. A reward signal is returned every time an action is taken. The sum of the rewards in the future is to be maximized. Learning starts in a state in which a result to be brought about by the action is totally unknown or known only incompletely. In other words, the robotic system 2012 can obtain the result of an action as data only after the robotic system 2012 actually takes the action. This means that an optimal action can be searched for by, e.g., trial and error. Learning can be started from a good starting point by starting from an initial state in which learning has been performed in advance. In reinforcement learning, in addition to determination and classification, an action is learned to acquire a method for learning an appropriate action in consideration of interactions exerted on the environment by the action, e.g., learning to maximize the reward to be obtained in the future.

In one example, the reinforcement learning can be employed by the training/learning system 2015 and can be implemented by, e.g., deep machine learning methods. The exemplary embodiments of the present invention can be directed generally to deep machine learning methods and apparatuses. Some implementations are directed to training a deep neural network, such as a convolutional neural network (also referred to herein as a "CNN"), to predict a probability that motion data for an end effector of a robot results in successful use of the Boltzmann machine equations to control a robotic system.

In some implementations of the training/learning system 2015, training the convolutional neural network includes applying, to the convolutional neural network, the training example input of a given training example of the training examples. In some of those implementations, applying the training example input of the given training example includes: applying the image of the given training example as input to an initial layer of the convolutional neural network and applying the end effector motion vector of the given training example to an additional layer of the convolutional neural network. The additional layer can be downstream of the initial layer. In some of those implementations, applying the end effector motion vector to the additional layer includes: passing the end effector motion vector through a fully connected layer to generate end effector motion vector output and concatenating the end effector motion vector output with upstream output. The upstream output can be from an immediately upstream layer of the convolutional neural network that is immediately upstream of the additional layer and that is downstream from the initial layer and from one or more intermediary layers of the convolutional neural network. The initial layer can be a convolutional layer and the immediately upstream layer can be a pooling layer.

In some implementations, the training includes performing backpropagation on the convolutional neural network based on the training example output of the plurality of training examples. Therefore, the learning/training system 2015 can have the function of extracting, e.g., a useful rule, a knowledge representation, and a determination criterion by analysis from a set of data input to the learning/training system 2015, outputting determination results, and learning knowledge (machine learning). It is noted that a variety of machine learning techniques are available, which can be roughly classified into, e.g., "supervised learning," "unsupervised learning," and "reinforcement learning." To implement these techniques, "deep learning" can be employed, as discussed above.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of predicting higher-order moments from time-series datasets (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method executed on a processor for employing a dynamic Boltzmann machine (DyBM), the method comprising:
acquiring time-series datasets transmitted from a source node to a destination node of a neural network including a plurality of nodes;
learning, by the processor, a time-series generative model based on the DyBM with eligibility traces; and
obtaining, by the processor, parameters of a generalized auto-regressive heteroscedasticity (GARCH) model to predict a time-varying second-order moment of the times-series datasets,
wherein the GARCH is given by:

$$\sigma_t^2 = v_0 + w_1 e_{t-1}^2 + u_1 \sum_{i=d+1}^{\infty} \lambda_1^{i-d} e_{t-i}^2,$$

where $\sigma$ is a variance, t is time, w is a weight, v is a learning parameter, $\lambda$ is a decay rate, d is a conduction delay, e is the square of the prediction error of DyBM for Gaussian Distribution, u is a learning parameter, and i, j are units in layers.

2. The method of claim 1, wherein the time-series datasets are financial time-series data.

3. The method of claim 1, wherein the DyBM is trained online to predict time-varying means by maximizing a log-likelihood that assumes the time-varying second-order moment is fixed.

4. The method of claim 1, wherein a conditional probability density of each input value at one time point on a condition that an input data sequence has occurred in the time-series datasets is:

$$p(x^{[t]} \mid x^{[t-T,t-1]}) = \prod_{j=1}^{N} p_j(x_j^{[t]} \mid x^{[t-T,t-1]}),$$

where x is a series of patterns, t is time, N is a number of layers, T is layers of units, and i, j are units in layers.

5. The method of claim 4, wherein a Gaussian distribution for each j unit of the conditional probability density is:

$$p_j(x_j^{[t]} \mid x^{[t-T,t-1]}) = \frac{1}{\sqrt{2\pi\sigma_j^2}} \exp\left(-\frac{(x_j^{[t]} - \mu_j^{[t]})^2}{2\sigma_j^2}\right),$$

where $\sigma$ is a variance, $\mu$ is an expected value, x is a series of patterns, t is time, and T is layers of units, and i, j are units in layers.

6. The method of claim 5, wherein the expected value of the j-th unit is:

$$\mu^{[t]} = b + \sum_{\delta=1}^{d-1} W_\delta x^{[t-\delta]} + \sum_{k=1}^{K} U_k \sum_{\delta=d}^{\infty} \lambda_k^{(\delta-d+1)} x^{[t-\delta]},$$

where b is a bias, w is a weight, d is a conduction delay, K are column vectors, U is a learning parameter, t is time, and $\delta$ is a time point difference.

7. The method of claim 1, wherein the GARCH is given by:

$$x_t = \mu + \sigma_t \epsilon_t, \ \epsilon_t \sim N(0, 1)$$

$$\sigma_t^2 = a_0 + \sum_{i=1}^{p} a_i (x_{t-i} - \mu)^2 + \sum_{j=1}^{q} b_j \sigma_{t-j}^2,$$

where $\sigma$ is a variance, t is time, x is a series of patterns, $\mu$ is an expected value, $\epsilon$ is a noise that is assumed to follow Normal distribution, b is a bias, a is an eligibility trace, and i, j are units in layers.

8. A non-transitory computer-readable storage medium comprising a computer-readable program executed on a processor for employing a dynamic Boltzmann machine (DyBM), wherein the computer-readable program when executed on the processor causes a computer to perform the steps of:
acquiring time-series datasets transmitted from a source node to a destination node of a neural network including a plurality of nodes;
learning, by the processor, a time-series generative model based on the DyBM with eligibility traces; and
obtaining, by the processor, parameters of a generalized auto-regressive heteroscedasticity (GARCH) model to predict a time-varying second-order moment of the times-series datasets,
wherein the GARCH is given by:

$$\sigma_t^2 = v_0 + w_1 e_{t-1}^2 + u_1 \sum_{i=d+1}^{\infty} \lambda_1^{i-d} e_{t-i}^2,$$

where $\sigma$ is a variance, t is time, w is a weight, v is a learning parameter, $\lambda$ is a decay rate, d is a conduction delay, e is the square of the prediction error of DyBM for Gaussian Distribution, u is a learning parameter, and i, j are units in layers.

9. The non-transitory computer-readable storage medium of claim 8, wherein the time-series datasets are financial time-series data.

10. The non-transitory computer-readable storage medium of claim 8, wherein the DyBM is trained online to predict time-varying means by maximizing a log-likelihood that assumes the time-varying second-order moment is fixed.

11. The non-transitory computer-readable storage medium of claim 8, wherein a conditional probability density of each input value at one time point on a condition that an input data sequence has occurred in the time-series datasets is:

$$p(x^{[t]} \mid x^{[t-T,t-1]}) = \prod_{j=1}^{N} p_j(x_j^{[t]} \mid x^{[t-T,t-1]}),$$

where x is a series of patterns, t is time, N is a number of layers, T is layers of units, and i, j are units in layers.

12. The non-transitory computer-readable storage medium of claim 11, wherein a Gaussian distribution for each j unit of the conditional probability density is:

$$p_j(x_j^{[t]} \mid x^{[t-T,t-1]}) = \frac{1}{\sqrt{2\pi\sigma_j^2}} \exp\left(-\frac{(x_j^{[t]} - \mu_j^{[t]})^2}{2\sigma_j^2}\right),$$

where $\sigma$ is a variance, $\mu$ is an expected value, x is a series of patterns, t is time, and T is layers of units, and i, j are units in layers.

13. The non-transitory computer-readable storage medium of claim 12, wherein the expected value of the j-th unit is:

$$\mu^{[t]} = b + \sum_{\delta=1}^{d-1} W_\delta x^{[t-\delta]} + \sum_{k=1}^{K} U_k \sum_{\delta=d}^{\infty} \lambda_k^{(\delta-d+1)} x^{[t-\delta]},$$

where b is a bias, w is a weight, d is a conduction delay, K are column vectors, U is a learning parameter, t is time, and $\delta$ is a time point difference.

14. The non-transitory computer-readable storage medium of claim 8, wherein the GARCH is given by:

$$x_t = \mu + \sigma_t \epsilon_t, \ \epsilon_t \sim N(0, 1)$$

$$\sigma_t^2 = a_0 + \sum_{i=1}^{p} a_i(x_{t-i} - \mu)^2 + \sum_{j=1}^{q} b_j \sigma_{t-j}^2,$$

where $\sigma$ is a variance, t is time, x is a series of patterns, $\mu$ is an expected value, $\epsilon$ is a noise that is assumed to follow Normal distribution, b is a bias, a is an eligibility trace, and i, j are units in layers.

15. A system for employing a dynamic Boltzmann machine (DyBM), the system comprising:
a memory; and
one or more processors in communication with the memory configured to:
acquire time-series datasets transmitted from a source node to a destination node of a neural network including a plurality of nodes;
learn, by the processor, a time-series generative model based on the DyBM with eligibility traces; and
obtain, by the processor, parameters of a generalized auto-regressive heteroscedasticity (GARCH) model to predict a time-varying second-order moment of the times-series datasets,
wherein the GARCH is given by:

$$\sigma_t^2 = v_0 + w_1 e_{t-1}^2 + u_1 \sum_{i=d+1}^{\infty} \lambda_1^{i-d} e_{t-i}^2,$$

where $\sigma$ is a variance, t is time, w is a weight, v is a learning parameter, $\lambda$ is a decay rate, d is a conduction delay, e is the square of the prediction error of DyBM for Gaussian Distribution, u is a learning parameter, and i, j are units in layers.

16. The system of claim 15, wherein the time-series datasets are financial time-series data.

17. The system of claim 15, wherein the GARCH is given by:

$$x_t = \mu + \sigma_t \epsilon_t, \ \epsilon_t \sim N(0, 1)$$

$$\sigma_t^2 = a_0 + \sum_{i=1}^{p} a_i(x_{t-i} - \mu)^2 + \sum_{j=1}^{q} b_j \sigma_{t-j}^2,$$

where $\sigma$ is a variance, t is time, x is a series of patterns, $\mu$ is an expected value, $\epsilon$ is a noise that is assumed to follow Normal distribution, b is a bias, a is an eligibility trace, and i, j are units in layers.

* * * * *